United States Patent [19]

Cross

[11] Patent Number: 4,999,910

[45] Date of Patent: Mar. 19, 1991

[54] ROTARY WIRE STRIPPER AND METHOD OF USING

[75] Inventor: Dan A. Cross, Seattle, Wash.

[73] Assignee: The Boeing Company, Seattle, Wash.

[21] Appl. No.: 521,445

[22] Filed: May 10, 1990

[51] Int. Cl.⁵ .................. H01R 43/00; H02G 1/12
[52] U.S. Cl. ...................................... 29/825; 81/9.51; 29/426.5; 29/828
[58] Field of Search ............... 29/828, 867, 426.5, 29/825; 81/9.51; 30/90.1

[56] References Cited

U.S. PATENT DOCUMENTS

| | | | |
|---|---|---|---|
| 2,671,363 | 3/1954 | Wells | 81/9.51 |
| 3,484,936 | 12/1969 | Schwalm et al. | 29/828 |
| 3,486,216 | 12/1969 | Cimolino | 29/828 |
| 3,645,156 | 2/1972 | Meyer et al. | 83/9 |
| 4,345,362 | 8/1982 | de Givry | 29/867 |
| 4,715,100 | 12/1987 | Cross | 29/33 |
| 4,745,828 | 5/1988 | Stepan | 81/9.51 |

Primary Examiner—Carl E. Hall
Assistant Examiner—Carl J. Arbes
Attorney, Agent, or Firm—Bruce A. Kaser

[57] ABSTRACT

A wire stripper in accordance with the invention has a non-linear rate of blade closure where the stripper's blades first close quickly from an open position to near the wire that is to be stripped, followed by a slow rate of closure as the blades cut through the wire's insulation. The stripper also has a blade proximity sensor that involves placing a high voltage on the blades as they cut through the insulation so that a short-duration current pulse travels from the blades to the wire's center conductor as soon as the insulation is broken apart by the blades. Such pulse is sensed, and further inward movement of the blades toward the center conductor is immediately stopped, in order to prevent the blades from nicking or scraping the conductor.

10 Claims, 17 Drawing Sheets

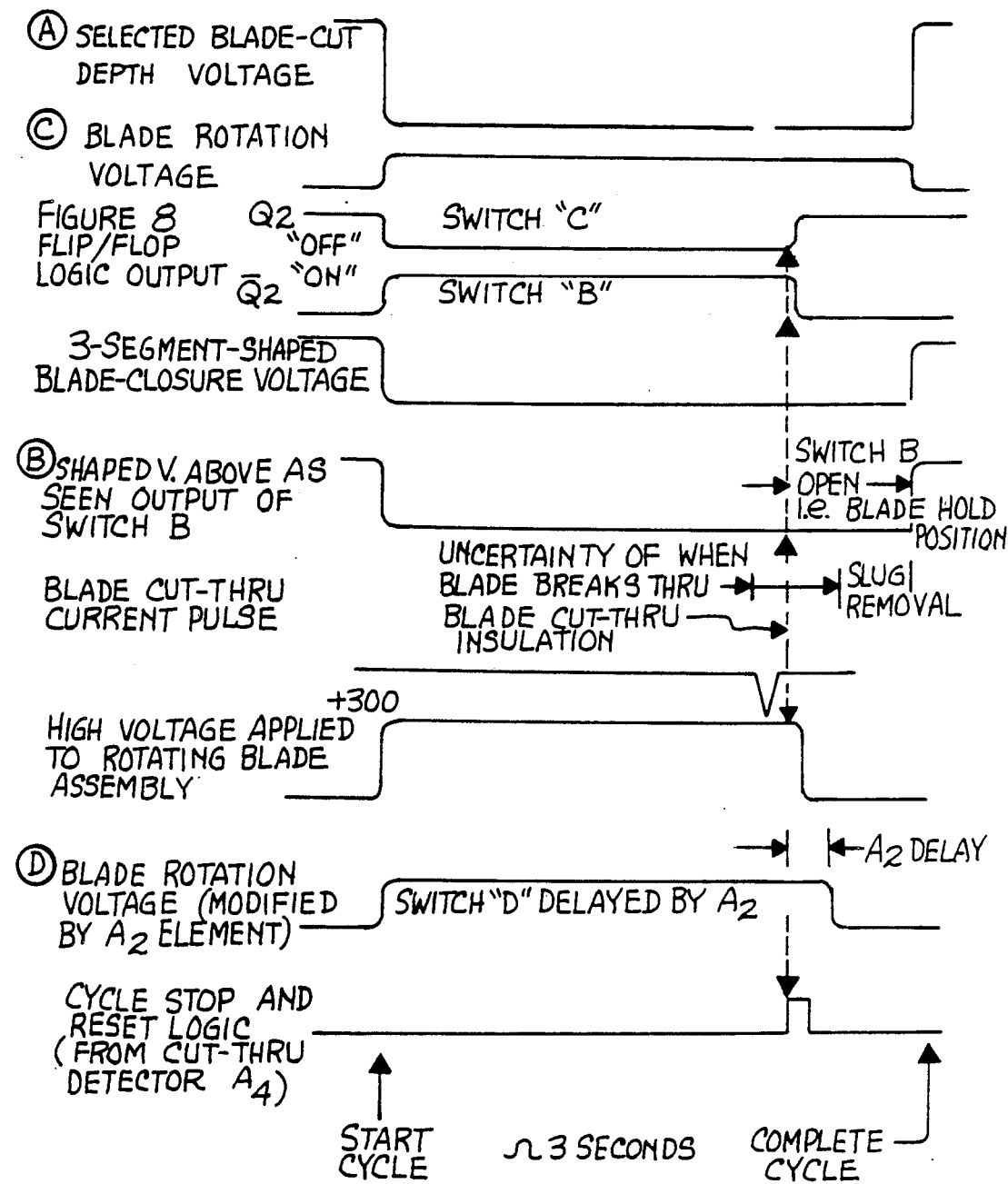
MAJOR WAVEFORMS AND TIMING RELATIONSHIPS
*Fig.* 11

ROTARY WIRE STRIPPER AND METHOD OF USING

TECHNICAL FIELD

This invention relates in general to wire-stripping machines, and more particularly, to rotary wire strippers that have blades driven in a circular path around the end of a wire to be stripped, such blades also moving radially inwardly until they contact and cut through the wire's insulation for removing the same from the end of the wire.

RELATED APPLICATIONS

The invention disclosed here is the last in a series of three related applications, all by the same inventor, the first two being identifiable by U.S. patent application serial numbers 07/441,178 (filed Nov. 27, 1989) and 07/446,181 (filed Dec. 5, 1989), which are respectively entitled "Wire Guide for Rotary Wire Stripper" and "Notched Blade for Rotary Wire Stripper."

BACKGROUND INFORMATION

Similar to the related applications discussed above, the invention disclosed here is designed to be used in conjunction with a rotary wire stripper of a type disclosed in U.S. Pat. No. 4,745,828, issued to Stepan on May 24, 1988. With this type of stripper, the distance of inward blade movement is operator selectable so that a single machine is capable of stripping a wide range of wire types and sizes. Hereafter, such stripper will be referred to simply as the '828 stripper. Although it is to be understood that the description of the invention set forth here is specifically directed to improving the operation of such stripper, the invention is also wellsuited for use in conjunction with other kinds of strippers as well.

A review of the above co-pending applications reveals that both are concerned with the problem of stripping the insulation from the end of a wire without the blade nicking or scraping the wire's center conductor. In particular, the applications are directed to aerospace applications where such nicking or scraping is undesirable, and generally is not allowed. The applications called the piece of insulation removed from the wire's end a "slug," and the same terminology will sometimes be employed here The '178 application relates to an improved wire guide for the '828 stripper which better serves to hold both the slug and the wire's center conductor in a fixed position relative to the stripper's blades, and prevents the center conductor from jiggling back and forth into contact with the blades after the slug has been cut all the way through, and while it is pulled or stripped from the wire's end.

The '181 application discloses an improved blade that enables cutting or chipping through insulation without causing much pressure build-up by the blades as they cut, and is particularly directed to hard, glass-like forms of insulation. As was explained there, using conventional blades to cut through hard insulation creates a high pressure build-up between the blades' cutting edges and the insulation. The sudden release of pressure that occurs when the blades break through the insulation causes them to overtravel and contact and nick the center conductor.

The present invention deals with still another aspect of improving the '828 stripper that is unrelated to the specific solutions to center conductor nicking and scraping provided by the '828 and '178 applications, although the invention is concerned with the same overall problem. Unlike the '828 and '178 applications, however, the present invention is solely directed to the various aspects of controlling blade closure of the stripper, and improves such control in order to avoid nicking and scraping.

Referring to FIG. 2 herein, for example, which is labeled "Prior Art," generally shown at 1 is a commercial embodiment of the '828 stripper. Such embodiment is known in the trade as a Schlueniger Model 207S wire stripper, and when such model designation is called out here, it is to be understood that it and the '828 stripper are generally one and the same.

A review of the '828 patent reveals that such stripper 1 includes many components, and it is to be understood by the reader that the disclosure of such patent is incorporated herein by reference. Although it is not necessary, in order to understand the present invention, that each and every component of the stripper 1 shown in FIG. 1 be explained, what follows will be a general description of certain stripper components. Such description should be sufficient to make it clear to the reader what the differences are between the '828 stripper, as originally disclosed in its underlying patent, and the improvements for such stripper which are the thrust of the present invention.

Briefly, the stripper 1 has a casing or housing structure 3 that both receives and provides mounting structure for the various other stripper components. The stripper 1 has two diametrically-opposed blades 5, 7, which are driven in rotation around the end of a wire that is to be stripped (the wire is not shown in FIG. 1). Simultaneously, the blades 5, 7 move generally radially inwardly, coming into contact with the wire's insulation, and cutting through its thickness.

FIG. 4 illustrates the stripper's blade-drive assembly, which is indicated generally at 9. This assembly includes a hollow, electrically conductive drive shaft 11, and a head assembly 13 mounted to one end of the shaft, the latter carrying blades 5, 7. The head assembly 13 also carries wire guides 5A, 7A that are positioned adjacent the blades 5, 7. These will not be further described here as they are not germane to the present invention. Any questions concerning such guides can be answered by referring to the '828 patent, or to the '178 application which is soon to be published as a U.S. patent.

Rotation of shaft 11 in turn rotates blades 5, 7 around the wire that is to be stripped (not shown in FIG. 4, but see FIG. 8, for example). As is explained in detail in the '828 patent, the head assembly 13 has a pair of lever arms 15, 17 which are rotatably mounted to head assembly 13, and an actuation bevel 19. Shaft 11 contains an axially-extending thrust tube 21 that moves actuation bevel 19 linearly for symmetrically pivoting lever arms 15, 17 as shaft 11 rotates. When actuation bevel 19 moves from right to left, for example, this causes the stripper blades 5, 7 to simultaneously move radially inwardly in circling fashion toward the wire to be stripped, until their edges contact and cut through the wire's insulation. Thrust tube 21 is also hollow, the reason for which is clear in the '828 patent. FIG. 15 shows the blade-drive assembly 9 mounted to the stripper's housing structure 3, where the top of the housing has been removed in order to provide a better view of the housing's interior. The stripper 1 has motors that control the rate of blade closure of the blade-drive assembly 9, shown in FIG. 4, and also the linear reciprocation of such assembly back and forth for stripping the end of a wire. The latter motion is adequately described in the '828 patent, and need not be repeated in great detail here. Referring to FIG. 16, what is generally pertinent to the present invention, however, is that the stripper 1 has two motors, one a conventional motor 23 and the other a conventional servodrive 25 (see also FIGS. 3 and 5), whose function is to respectively rotate the stripper's blades 5, 7 and move them inwardly or outwardly.

As is clearly shown in FIG. 16, motor 23 rotates shaft 11 by means of a conventional belt and pulley arrangement that is indicated generally at 27. Blade closure is simultaneously accomplished by servodrive 25 that is mounted to a traveling bracket 29. Such bracket 29 moves back and forth with the blade-drive assembly 9, and it is driven by another servodrive 31 that is in engagement with bracket 29 via a worm gear.

Servodrive 25 controls blade closure. That is to say, servodrive 25 drives another sliding bracket 37 via worm gear 35. The latter bracket 37 is fixedly connected to the end of thrust tube 21 which, as described above, drivingly moves actuation bevel 19.

Typically, the period of rotation of blades 5, 7 is set by electronic controls, and the motor 23, which actually drives rotation or the circling movement of the blades' is controlled by a voltage pulse of fixed duration This is shown at 39 in FIG. 5. The inward movement of the blades 5, 7 is also controlled by a voltage pulse 41 of fixed duration, but one that is voltage-variable in amplitude depending on the selected end-point of inward blade movement.

For example, a certain fixed voltage (Vopen) applied to the control of servodrive 25 signifies a totally "open" blade position, as indicated at 43 in FIG. 5. A certain end-point voltage (Vout) is defined when the operator selects the depth of the cut into the wire's insulation, or the final gap between the stripper's blades 5, 7 at their inwardmost position. This is indicated at 45 in FIG. 5, which also shows that the cycle times for both blade rotation and blade closure are substantially identical in the '828 stripper. The control circuitry of the '828 stripper linearly decreases the magnitude of the servodrive's control voltage from Vopen to Vout as shown at 41.

The arrangement illustrated at 41, 43, 45 in FIG. 5 forces the blade's cut depth to be fixed in accordance with values selected by the operator, based upon typical dimensions of the wire being stripped, without regard to actual variable conditions that may be present during wire stripping. By way of illustration, the operator of the stripper 1 selects or defines the end-point voltage 45 based on the diameter of a given wire that is about to be stripped. Such diameter is given to the operator by the wire's manufacturer, and will have a certain standard or conventional value such as, for example, 0.025 inches. The operator accordingly selects an end-point voltage that corresponds to setting a 0.025 gap between the cutting edges of blades 5, 7 at the end of their inward travel. Of course, what actually happens, by way of clarification, is that the operator sets the gap on the '828 stripper and that defines the magnitude of the end-point voltage.

Such setting is selected assuming that the conductor is concentric relative to the wire's insulation, and that the stripper's wire guides hold the wire exactly at the mid-point between the blades 5, 7. In actuality, such assumptions are generally not true. It is typical, for example, that the true diameter of the wire's center conductor may vary somewhat from manufacturer specifications, or from the 0.025 inches in the illustration given above, and the conductor is rarely exactly concentric relative to the surrounding insulation. This means that the selected gap often does not match the center conductor's true diameter, and the center conductor is typically off-set from the mid-point between the blades 5, 7. Therefore, selecting a nonvariable end-point voltage 45 fixes the inward travel of blade movement, regardless of these kinds of variations, and causes nicking or scraping of the wire's center conductor if the wire is out-of-round, or if its true diameter is different from the one specified by the operator.

To reiterate what was said in the co-pending applications identified above, nicking is impermissible in certain kinds of manufacturing environments, and particularly, in aircraft manufacturing. As a person skilled in the art would know, it is typical that a wire's center conductor consists of a plurality of small strands of copper that are twisted or braided together, instead of a single copper wire. Such strands are typically plated with a protective coating. Nicking one or more strands removes such coating, thus creating a potential for the on-set of long-term corrosion.

One drawback associated with the stripper disclosed in the '828 patent is that it has no means for detecting and controlling blade proximity relative to the wire's center conductor, and to accommodate for variations or deviations in the conductor's expected diameter or location. This has made it difficult or impossible to universally implement a single '828 stripper for stripping all kinds of wires, at least in the aircraft manufacturing industry where center conductor nicking is not allowed.

A second drawback associated with the '828 stripper is that it too quickly closes the blades 5, 7 on the wire to be stripped. This creates poor cutting or stripping quality in that it tends to fray the wire's insulation rather than cut it cleanly, and it also exacerbates center conductor nicking because it creates a higher level of blade dynamic motion. The latter causes the blades 5, 7 to physically travel beyond the point set by Vcut 45.

Up to the present, aircraft manufacturers have not been able to use the '828 stripper because of the nicking problems associated therewith. Instead, such manufacturers have used a multitude of fixed blade strippers, each of which is unique for a particular wire type or size that is to be used on an airplane. As will become apparent, implementation of the present invention improves the performance of the '828 stripper, and similar kinds of strippers, in that it makes them functional for use in manufacturing environments where nicking cannot be tolerated. The way the invention accomplishes this will become understood after consideration of the following.

SUMMARY OF THE INVENTION

An improved rotary wire stripper in accordance with the invention has a nonlinear rate of blade closure from the open position until the wire's insulation is completely cut through. As described above, the invention is designed to improve the performance of the '828 stripper. Such stripper has two motors that control blade motion. One merely rotates the blades in circling fashion around the wire. The other is a servodrive that actuates the blades' closure rate relative to each other, and to the wire. Both motors are controlled by voltage signals.

In the present invention, the servodrive that controls blade closure is initially provided with a voltage signal at the beginning of a cutting cycle, the magnitude of which changes rapidly early in the cycle. This serves to quickly move the blades from an open position to a position where the blades are either very close to or in cutting contact with the wire's insulation. Thereafter, the rate of change in the magnitude of such signal is significantly reduced so that the blades correspondingly cut through the insulation near the wire's conductor at an extremely slow rate of inward travel.

This aspect of the invention makes two things possible: First, in strippers that otherwise utilize no means for sensing blade-to-conductor proximity, but instead merely select a target voltage that defines the final gap between the blades at their furthest point of inward travel, slowing down the rate of blade closure near the conductor reduces the amount of blade dynamic overtravel beyond the point set by the target voltage. Although this may not eliminate nicking when, as described above, the wire is out-of-round or the actual diameter of the wire's center conductor varies from its expected diameter, such control still accomplishes a certain reduction in nicking or scraping by the blades. It also makes for a much cleaner cut by eliminating frayed ends that may interfere with subsequent electrical connections when the wire is put into use. Second, for any strippers that utilize blade-to-conductor proximity sensing, which is also an important aspect of the invention disclosed here, slowing down the rate of blade closure near the conductor makes it easier to detect when the blades have broken through the insulation, and to stop further inward blade travel before the conductor is contacted.

Proximity sensing is accomplished in the present invention by first electrically isolating the stripper's blade-drive assembly. Such assembly generally includes an electrically-conductive drive shaft rotatably mounted to the stripper's housing or casing structure, and an electrically-conductive head assembly mounted to the shaft. The latter carries the stripper's blades. The head assembly rotates the blades around the wire as she shaft rotates. As described above, a motor rotates the shaft while a servodrive closes the blades. The blade-drive assembly is also electrically isolated from such motor and servodrive, as well as other stripper components.

At the beginning of a cutting cycle, a high DC voltage is applied to the blade-drive assembly, which further places a voltage on the stripper's blades As they out inwardly through the wire's insulation, the blades carry such voltage until they approach near the wire's center conductor.

The wire's center conductor is kept voltage-neutral during such action. However, when the blades approach sufficiently close to the center conductor, usually corresponding to when the blades break through the insulation adjacent the conductor, a current pulse is transmitted from the blades to the conductor, similar to a spark jumping a gap between a charged and uncharged surface when the electrical potential between them becomes sufficiently high. Such current pulse is sensed, and is used as an indicator of blade proximity. As soon as it is sensed, further inward movement of the blades is immediately stopped and the wire's insulation is stripped without the blades having come into contact with the center conductor.

Obviously, very short distances are involved between the point where the blades break through the wire's insulation and the center conductor's outer surface. However, since the rate of blade closure is extremely slow at this point, further inward travel can be stopped soon enough to prevent the blades from making contact.

After the above-described current pulse is transmitted from the blades to the center conductor, the center conductor then takes on a voltage and charge. This must be removed from the wire before the other end of the wire can be stripped. Therefore, while the stripper's blades are still in close proximity to the center conductor, the voltage on the stripper's blade-drive assembly is drawn to zero or near zero, which substantially removes its voltage and any charge associated therewith. This causes a reverse current-pulse to be transmitted from the charged center conductor to the stripper's blades, which consequently returns the center conductor to a voltage-neutral condition. The wire is thereafter removed from the stripper, and a high voltage is once again placed on the stripper's blade-drive assembly at the beginning of the next cutting cycle.

In order to accomplish the above-described proximity detection, dielectric materials are used to electrically isolate the blade-drive assembly from other stripper components. As described below, this may be accomplished by using a combination of dielectric bushings and/or dielectric inserts that separate conventional metal bearings from surrounding metal structures in the stripper. A commutator, mounted to the stripper's housing but electrically isolated therefrom, is in electrical contact with the blade-drive assembly for placing a voltage on it from a suitable power source. Control circuitry interconnects the commutator with the power source, and controls both the application and removal of the voltage on the blade-drive assembly in accordance with the above description.

Another significant aspect of the invention is that no preconnection exists between the center conductor of the wire to be stripped and electrical ground of the control circuit. In other words, the conductor is completely isolated electrically, other than the above-described current transmissions. This makes for a much simpler mode of proximity detection that is well-suited to mass production environments where large quantities of wire are being stripped.

The above-described features of the invention will become better understood upon consideration of the following description which is to be taken in conjunction with the drawings.

BRIEF DESCRIPTION OF THE DRAWINGS

In the drawings, like reference numerals and letters refer to like parts throughout the various views, unless indicated otherwise. Specifically, certain ones of the FIGS. utilize conventional electrical part designations such as Rx for resistors, Dx for diodes, Tx for transistors, etc. It would be immediately apparent to a person skilled in the art that "$D_1$" in FIG. 7, for example, is not the same part as "$D_1$" in FIG. 10a, as these two FIGS. set forth completely different circuitry. Repetitive use of the same part designation in different electrical schematics was made in order to facilitate the skilled person's reading of the description set forth below. The drawings are briefly described as follows:

FIG. 10b is the second in a series of two schematics, and is to be read together with FIG. 10a;

FIG. 11 is a series of time lines in accordance with the invention and illustrates major wave forms and timing relationships for controlling blade rotation and closure;

BEST MODE FOR CARRYING OUT THE INVENTION

Figure 1:
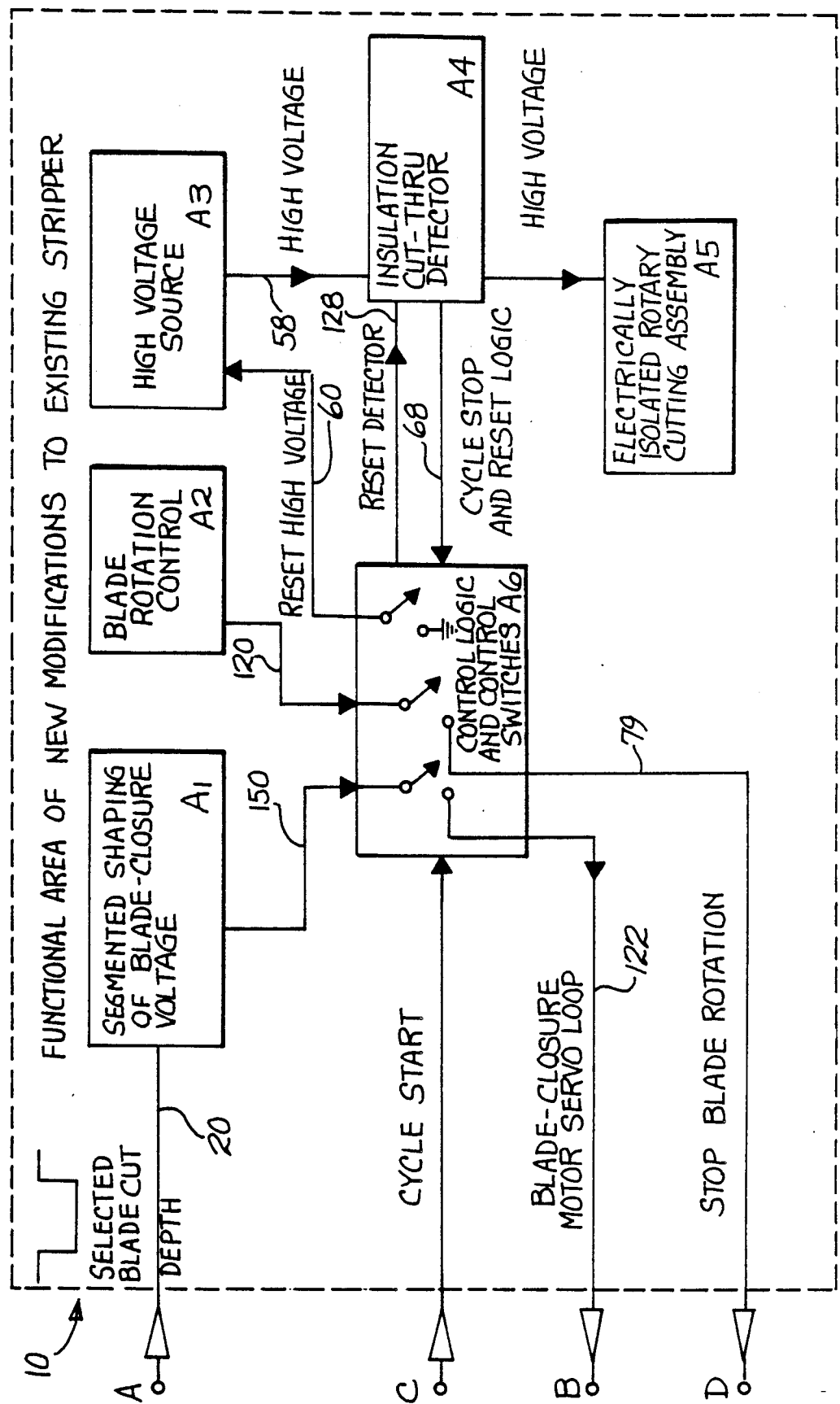
FIG. 1 is a schematic block diagram of the invention, and illustrates how the invention may be implemented to modify a rotary wire stripper like the one disclosed in U.S. Pat. No. 4,745,828.
Figure 2:
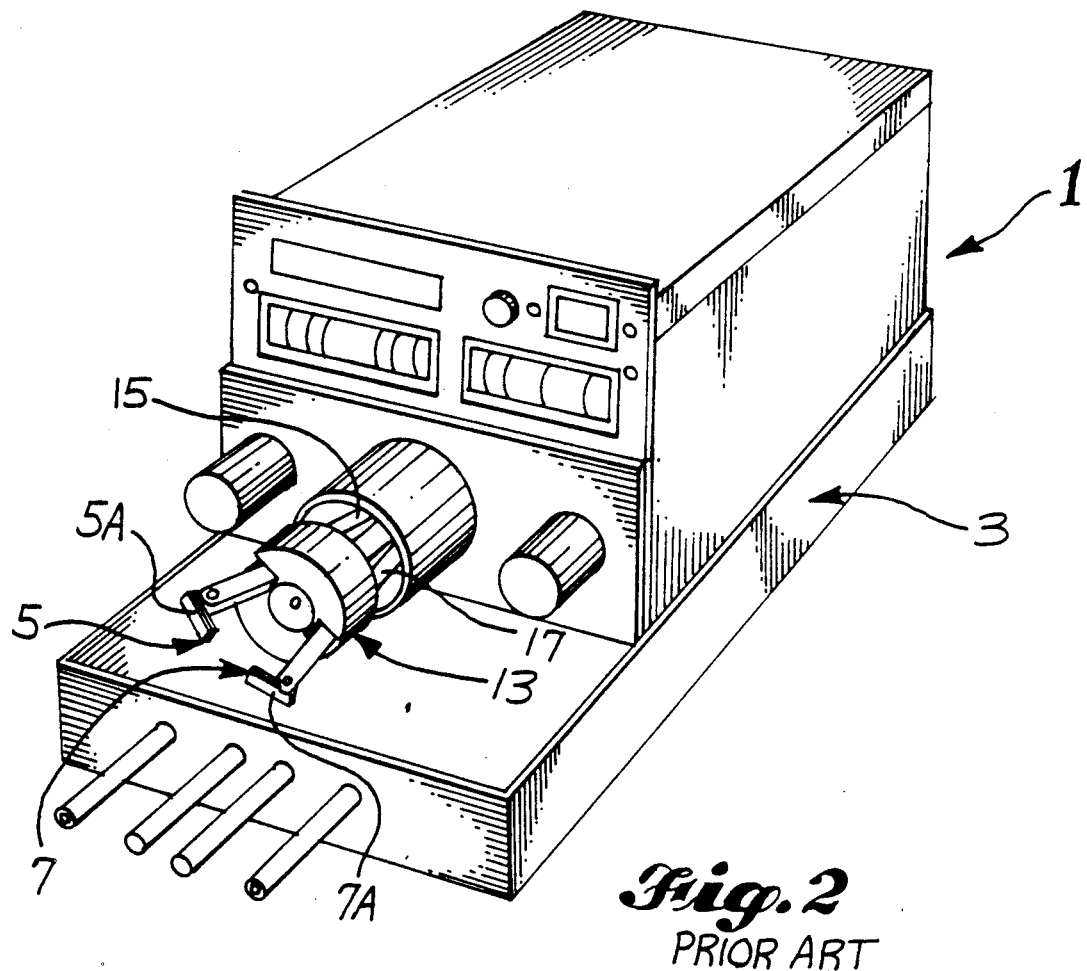
FIG. 2 is a pictorial view of a Schlueniger Model 207S wire stripper, which is a commercial embodiment of the stripper disclosed in the '828 patent, and is labeled "Prior Art"

Referring now to the drawings, and first to FIG. 1, therein is shown at 10 a schematic diagram illustrating the invention, including how it is implemented in the '828 stripper. The functional implementation of such circuitry is also schematically indicated at 10 in FIG. 5, even though such FIG. has been labeled "prior art." In FIG. 1, the letters A, B, C and D, respectively indicate points of modification to the existing circuitry of a Schlueniger Model 207S wire stripper which, as described above, is a commercial embodiment of the '828 stripper The letter "A" in combination with a numeral, such as "$A_1, A_2 \ldots A_x$," for example, indicates different sections of electrical circuitry in accordance with the invention.

Figure 3:
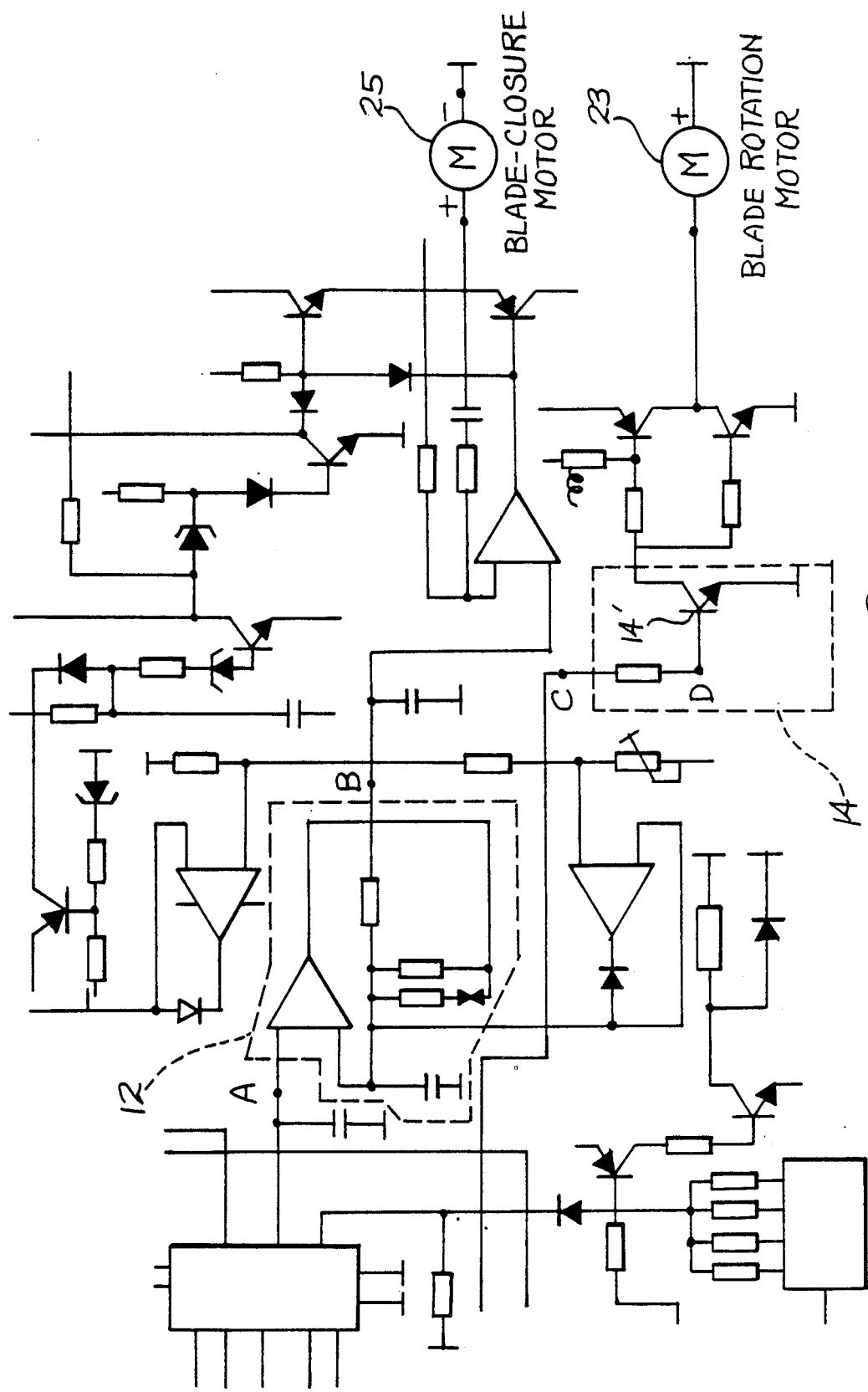
FIG. 3 is a portion of an actual electrical schematic distributed by the manufacturer of the stripper shown in FIG. 2, is labeled "Prior Art," and illustrates where circuitry modifications of such stripper could be made in order to implement the present invention.
Figure 5:
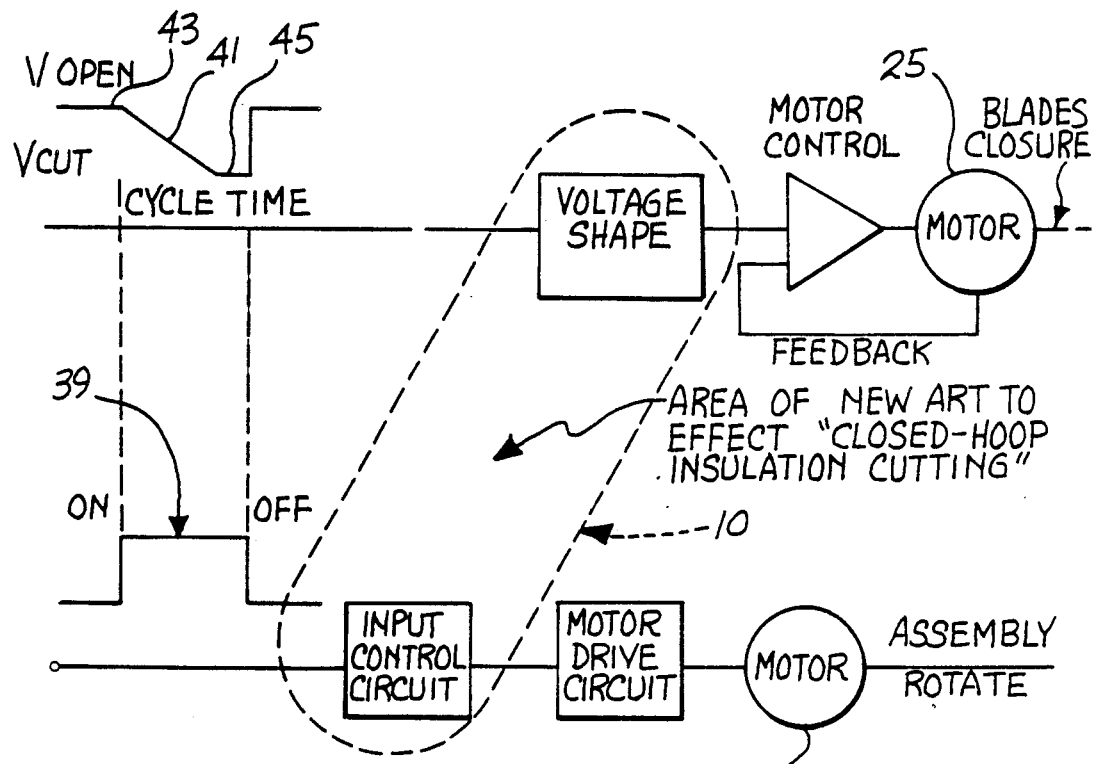
FIG. 5 is a schematic block-diagram illustrating the conventional blade control of the stripper shown in FIG. 2, and is labeled "Prior Art"

Referring now to FIG. 3, which is a portion of the 207S stripper's circuitry, the portion outlined by dashed line 12 generates the previously-described linearly changing blade closure voltage 41 shown in FIG. 5. In order to implement the present invention, such portion 12 would be deleted and replaced by the circuitry described below. The connection points A, B in FIG. 3 correspond to letters A, B in FIG. 1, and in the other FIGS.

The circuitry portion outlined by dashed lines 14 in FIG. 3 need not be eliminated, but instead, circuitry in accordance with the invention may be connected to such points in a manner that will be described later. The connection points C, D in FIG. 3 correspond to the same letters in FIG. 1, and in the other FIGS.

Figure 6:
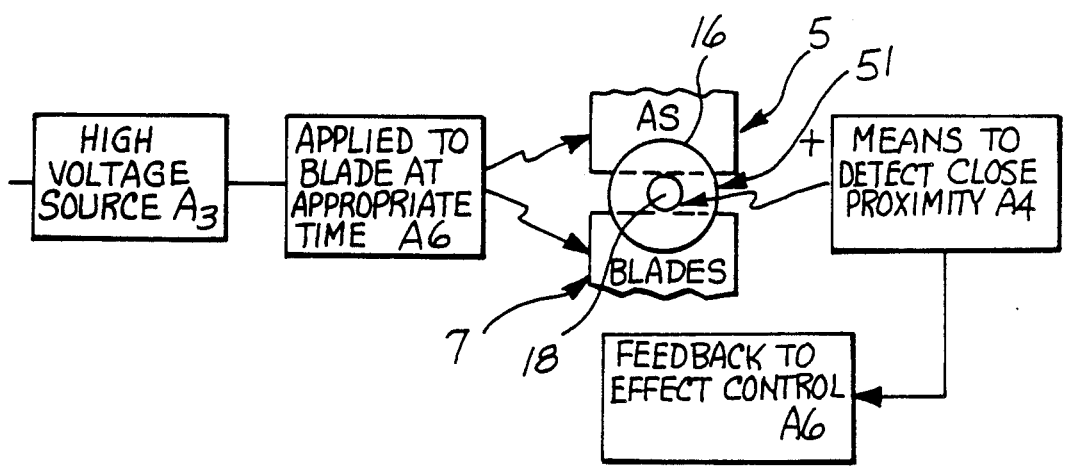
FIG. 6 is a schematic block-diagram illustrating how the present invention is used to detect blade proximity to a wire's center conductor during a stripping operation.

As mentioned above, the invention enables the '828 stripper to detect when its blades 5, 7 break through a wire's insulation 16 adjacent its center conductor 18 (see FIG. 6). Part of this involves slowing down the rate of the blade's inward movement as they approach the center conductor 18, in order to give the invention's proximity detection circuitry sufficient time to detect a breakthrough condition, and to stop further inward travel before the blade's 5, 7 actually contact the center conductor 18.

In order to accomplish the former, a segmented shaping of the blade closure voltage is provided that controls operation of the stripper's blade-closure servomotor 25, in a manner such that the stripper's blades first close rapidly during the beginning of a out cycle, but very slowly during the last few mils of insulation thickness.

Figure 4:
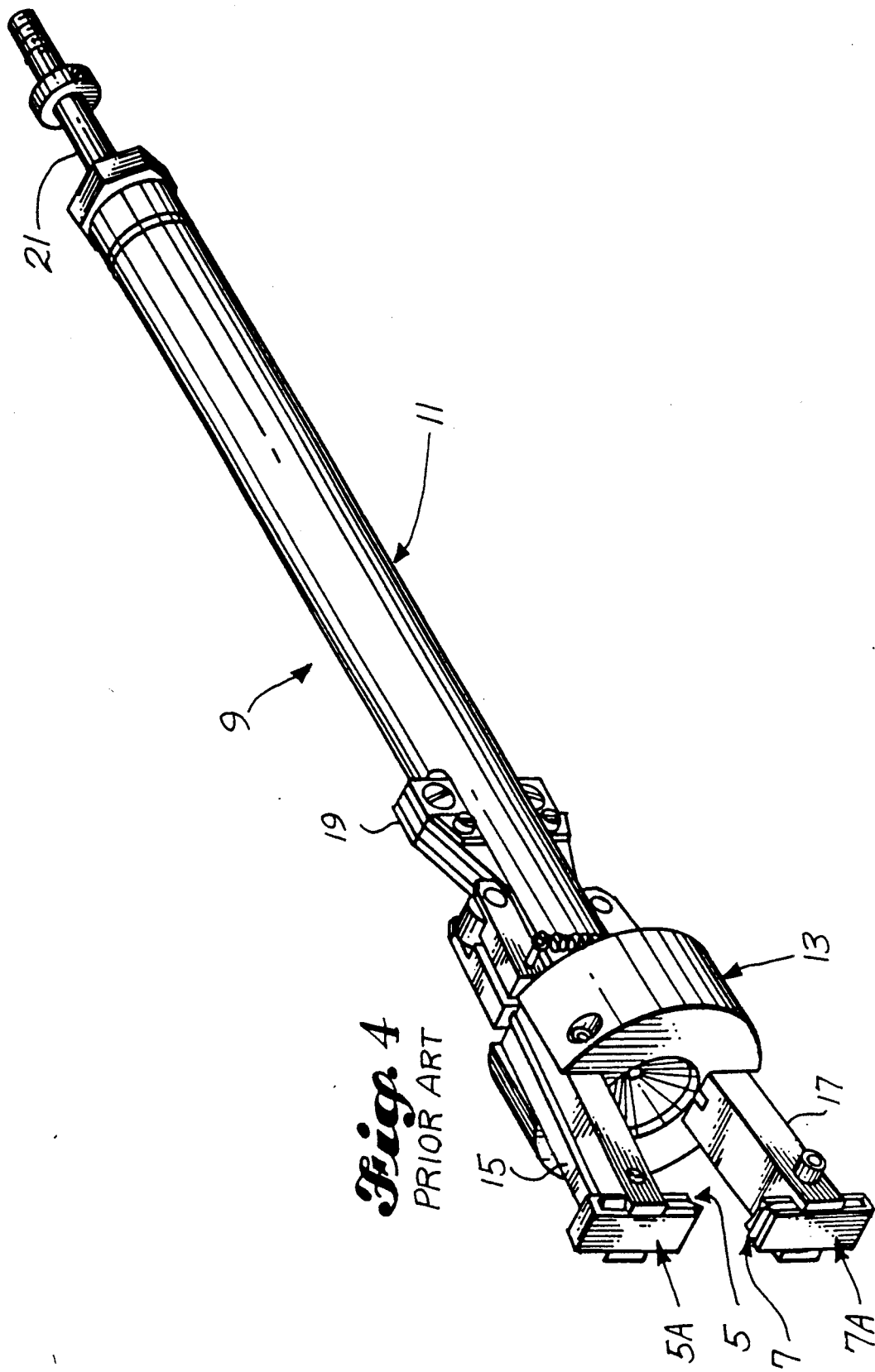
FIG. 4 is a pictorial view of a blade-drive assembly which is part of the stripper shown in FIG. 2, and is labeled "Prior Art"

During normal operation, the stripper's blades 5, 7 are widely spaced apart as shown in FIG. 4. Even though a large wire may be no more than approximately 100 mils in diameter (at least in aerospace applications), it is necessary to have such wide blade spacing to accommodate off-center placement of the wire due to handling errors and bent wire ends before stripping and/or blade closure. Although it is desirable to cut slowly through the wire's insulation 16, this takes more time than if the blades travel the linear path illustrated at 41 in FIG. 5. In order to make up for lost time, and so that the invention will not lengthen cutting cycles, it is necessary to bring the blades quickly to a nominally closed position where they are either in contact with the wire's insulation 16 or, depending on the wire's diameter, have actually begun to cut into the outer radius of the insulation 16.

Figure 8:
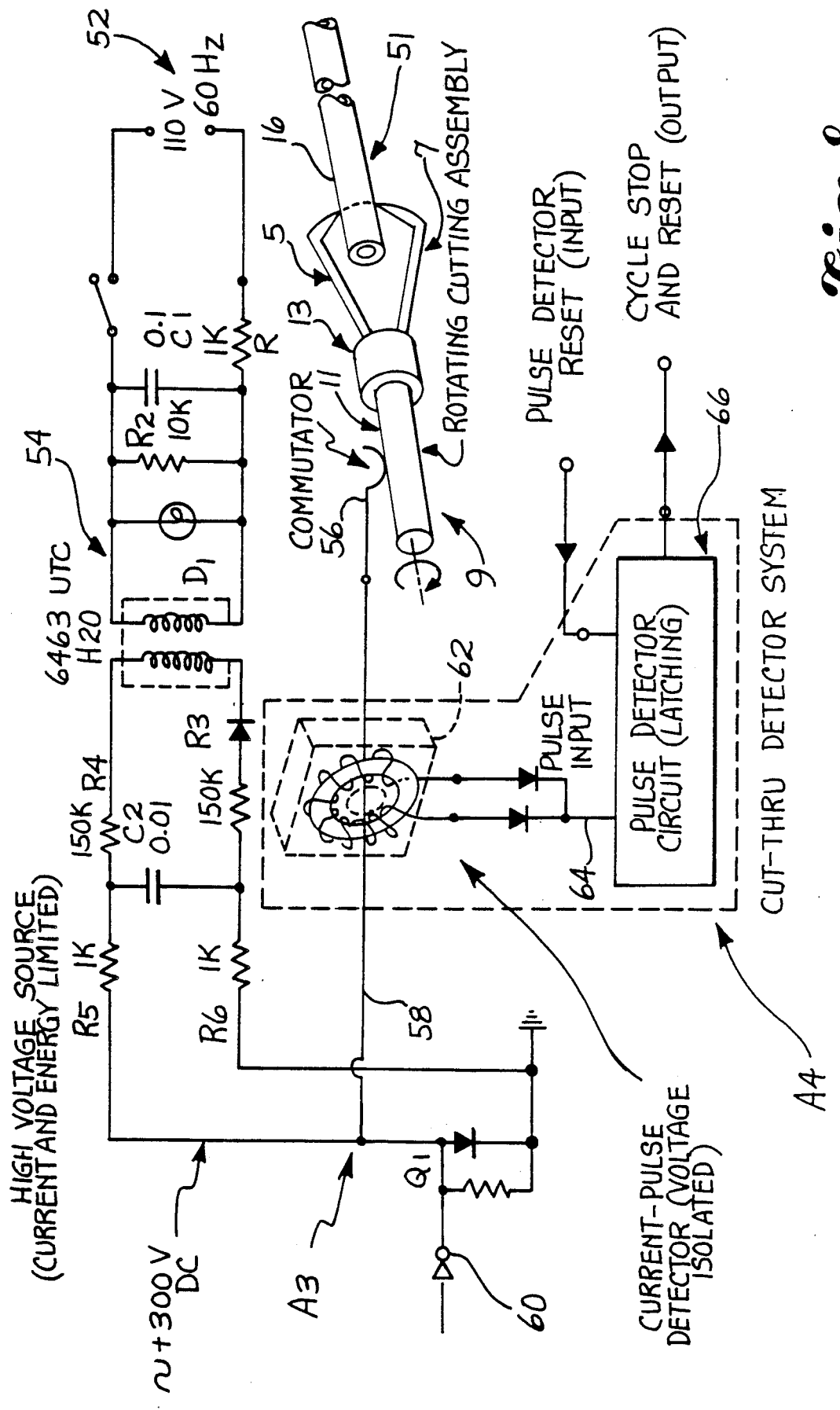
FIG. 8 is an electrical schematic illustrating how the stripper shown in FIG. 2 is to be modified in accordance with the invention for detecting blade proximity to a wire's center conductor, and corresponds to sections $A_3$ and $A_4$ of FIG. 1.

As a matter of definition, it is to be understood that a "cut cycle" is the period of time it takes for the stripper's blades 5, 7 to move from an open position into contact with the wire's insulation 16, followed by cutting through the insulation and stripping the slug by pulling it from the end of the wire, and still further followed by returning the blades to the initial open position. FIGS. 11-14 are all directed to showing what happens during a single cut cycle. It is to be further understood that an individual wire, like the wire 51 shown in FIG. 8, is stripped during a given cut-cycle. In subsequent out-cycles other wires are stripped whose size and types may vary.

Figure 7:
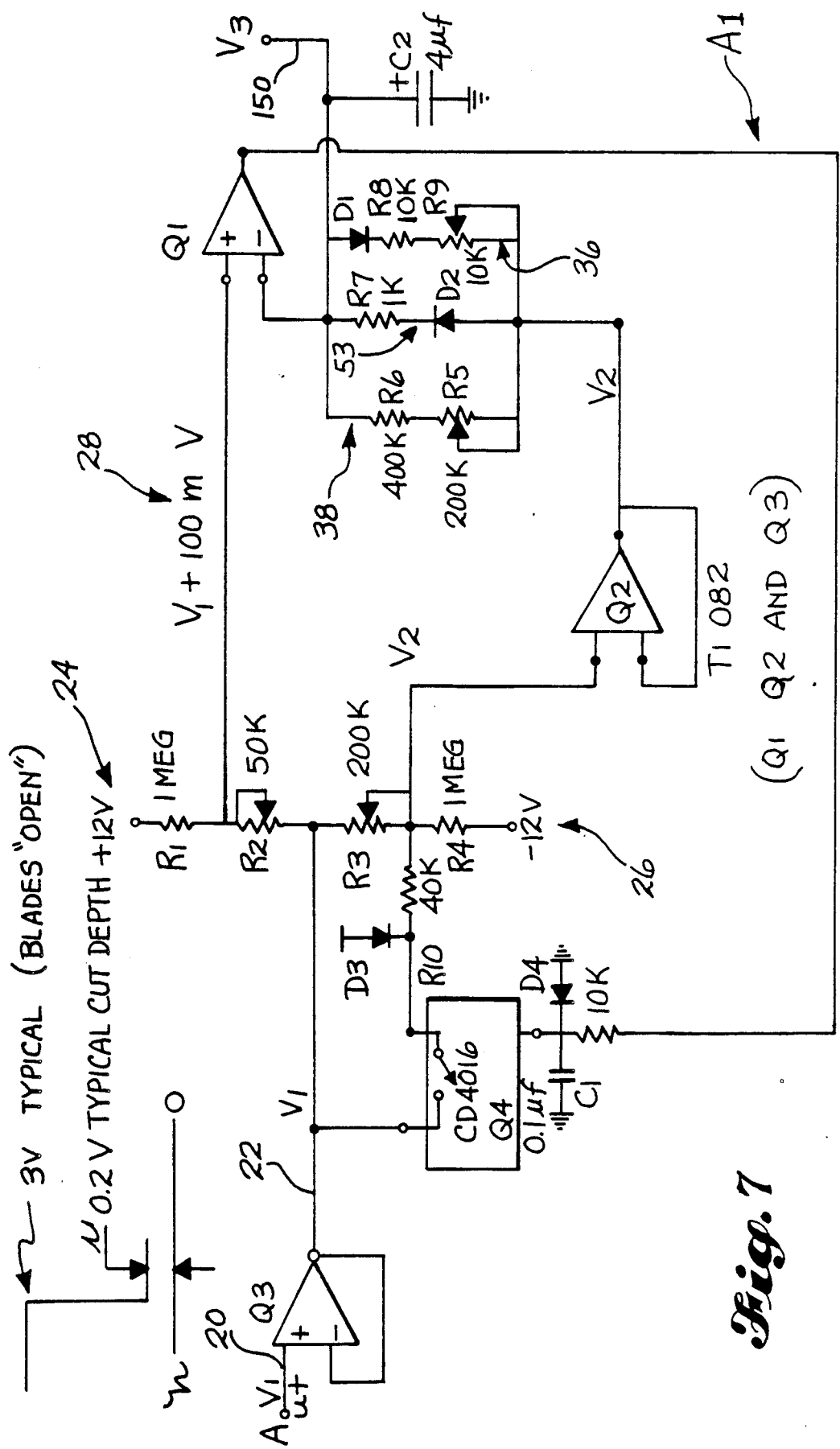
FIG. 7 is an electrical schematic in accordance with the invention for modifying the stripper shown in FIG. 2, the purpose of which is to control the rate of blade closure relative to a wire to be stripped, and corresponds to section $A_1$ of FIG. 1.
Figure 12:
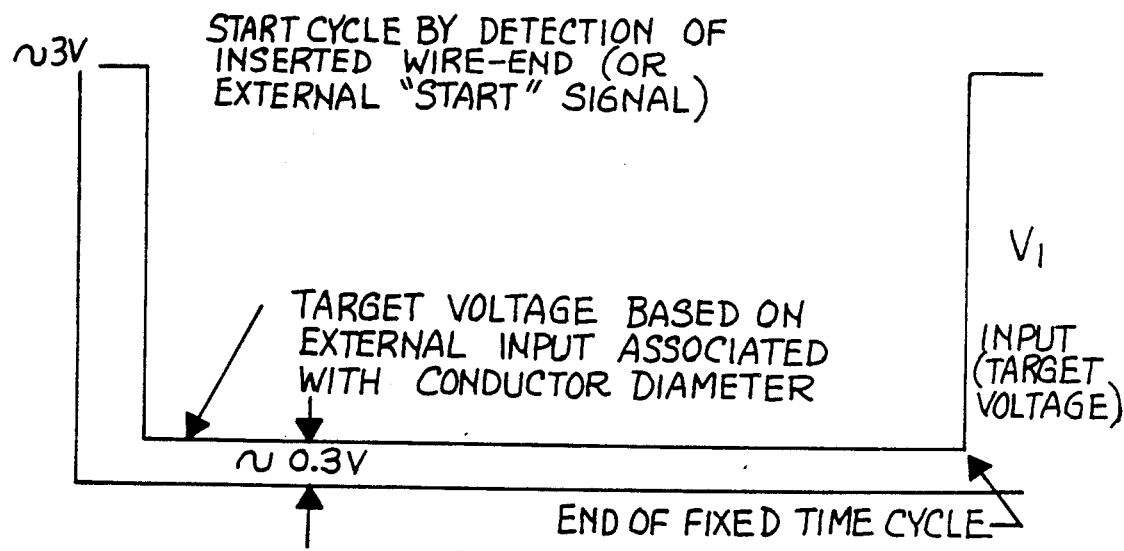
FIG. 12 is the first of a series of three graphs showing the wave forms of segmented shaping of blade-closure voltage in accordance with the invention.
Figure 13:
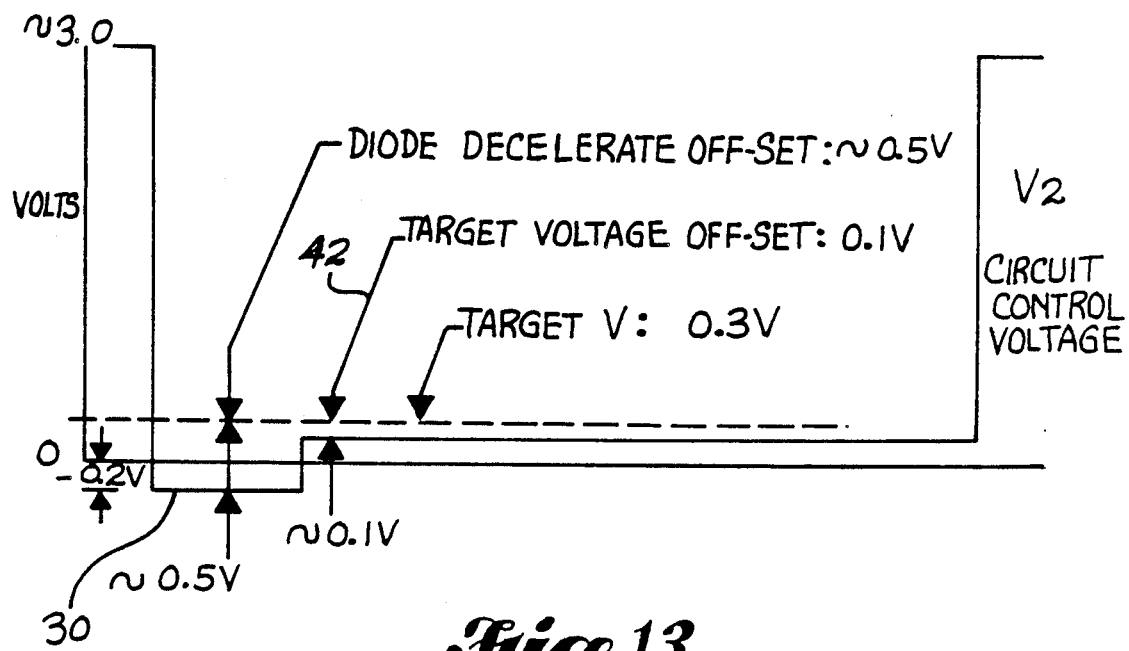
FIG. 13 is the second of a series of three graphs showing the wave forms of segmented shaping of blade-closure voltage in accordance with the invention, and is to be read in conjunction with FIG. 12.
Figure 14:
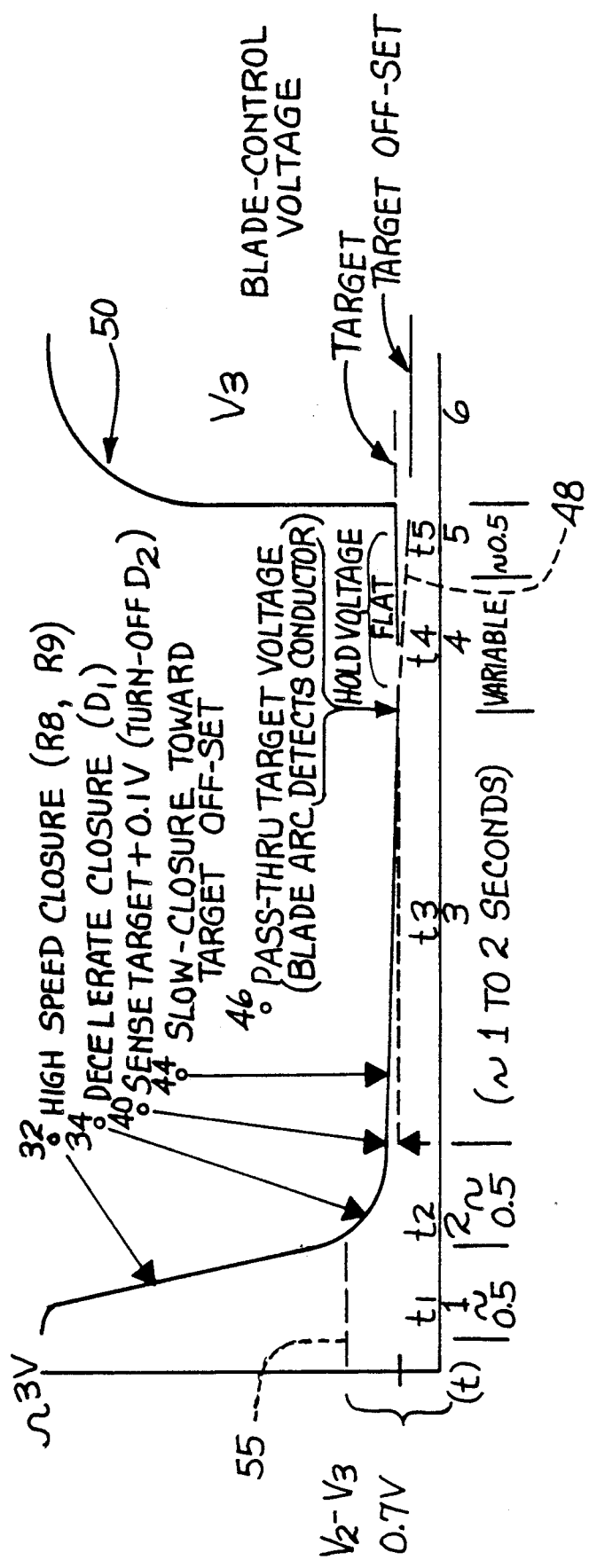
FIG. 14 is the third in a series of three graphs showing the wave forms of segmented shaping of blade-closure voltage in accordance with the invention, and is to be read in conjunction with FIGS. 12 and 13.

The control circuitry that accomplishes the blade closure function is schematically indicated in FIG. 1 at Al, which is entitled "Segmented Shaping of Blade-Closure Voltage." FIGS. 12-14 illustrate what is meant by use of the term "segmented shaping of blade-closure voltage," and FIG. 7 illustrates the preferable circuitry arrangement that may be used in replacement of circuitry block 12 in FIG. 3. Such replacement would accomplish the desired shaping of blade closure illustrated in FIG. 14 as described below.

Referring now to FIGS. 12 and 7, the voltage $V_1$ shown in FIG. 12 is the transition voltage from the stripper's blades "open" condition to the voltage (i.e. "target" voltage) associated with the selected depth of a cut that is to be made by the stripper. The $V_1$ waveform is produced by the Schlueniger Model 207S stripper, and is normally supplied to connection point A in FIG. 3. A typical voltage input for the open condition is approximately 3 volts while a target voltage may be on the order of approximately 0.2 volts. It is to be understood, of course, that the target voltage is a variable depending on the selected out depth corresponding to the gauge of the wire to be stripped. The voltage input $V_1$ is shown at 20 in FIG. 7. As just mentioned, this input corresponds to connection point A in FIG. 3. In the case of the Schlueniger stripper, the voltage at A is provided by other circuitry in such stripper that is not shown in the drawings here. Such input 20 is isolated from the FIG. 7 circuitry by a voltage follower $Q_3$, in a manner so that the $V_1$ wave form shown in FIG. 12 also appears at the output 22 of voltage follower $Q_3$.

A resistor network $R_1$, $R_2$, $R_3$, $R_4$, which serially interconnects +12 and −12 voltage sources, indicated respectively at 24, 26, generates two outputs: One is the $V_2$ wave form shown in FIG. 13, and the other is the $V_1$ wave form shown in FIG. 12, but positively off-set by 100 millivolts. The latter is generally indicated at 28, and is used as a reference voltage at a comparator $Q_1$.

The wave form $V_2$ is duplicated at the output of another voltage follower $Q_2$. This wave form ($V_2$) is further shaped by a network of resistors $R_5$, $R_6$, $R_7$, $R_8$, $R_9$, plus diodes $D_1$, $D_2$, which provide three current paths 36, 38, 53 for charging or discharging a capacitor $C_2$, the latter defining the final desired wave form $V_3$ shown in FIG. 14.

Reading FIG. 14 in conjunction with FIG. 7, the charging of the capacitor $C_2$ in FIG. 7 may be described as follows: The capacitor $C_2$ is initially charged to the blade "open" voltage $V_1$. When the voltage $V_2$ initially drops to approximately 0.2 volts (see reference numeral 30 in FIG. 13), capacitor $C_2$ rapidly discharges its charge through diode $D_1$ in leg 36 of FIG. 7, and the relatively low resistances of resistor $R_8$, $R_9$ (10 K ohms each). So long as the voltage difference $V_2$–$V_3$ is larger than approximately 0.7 volts, the diode $D_1$ is mostly resistive, and a rapid change or decline of $V_3$ occurs. This is generally indicated at 32 in FIG. 14, and represents rapid blade closure Where the stripper's blades quickly come together near the wire's insulation 16 or have actually begun to cut it. Preferably, this happens within a period of 0.5 seconds or so ($t_1$).

When the voltage difference $V_2$–$V_3$ reaches approximately 0.7 volts, (see 55 in FIG. 14) however, the diode effect of diode $D_1$ in leg 36 of FIG. 7 begins to dominate the total impedance of the discharge path of capacitor $C_2$, and a deceleration in the change in voltage $V_3$ begins to occur. This is identified by arrow 34 in FIG. 14, and also preferably occurs over a period of approximately 0.5 seconds ($t_2$). At this point, the blades of the stripper are near or have already begun to cut the wire's insulation 16.

The desired last phase of $V_3$ is a very slowly declining voltage that approaches and passes through the target voltage (see FIG. 14), the latter representing the nominal depth of the wire's insulation 16. As mentioned above, it is desirable that this last phase occur during the last few mils of blade cutting, and further it is preferable that it occurs over the last 50 mils or so of blade cutting.

Referring again to FIG. 7, the generation of the third phase of $V_3$ is achieved by switching the discharge path of capacitor $C_2$ from the initial circuitry leg indicated at 36, which contains diode $D_1$, to the leg indicated at 38 which contains resistors $R_5$ and $R_6$. This happens in the following manner: The comparator $Q_1$ in FIG. 7 is normally "off" which maintains a switch $Q_4$ in an open condition. This, in turn, keeps the target voltage offset of wave form $V_2$ at approximately 0.5 volts below the selected target voltage through the path of resistor $R_3$. When $V_3$ falls to the point identified by arrow 40 in FIG. 14, it is preferable that $V_3$ be approximately 100 millivolts above the target voltage. This is the same value as the reference voltage ($V_{1+100}$ millivolts) at the "positive" input of $Q_1$. At this point, $Q_1$ switches "on," which in turn closes switch $Q_4$.

Closure of switch $Q_4$ shunts resistor $R_3$ with $R_{10}$, thus creating a much lower resistance that restores $V_2$ to approximately 100 millivolts below the target voltage (see FIG. 13 at 42). At this point, $V_2$ equals the target voltage minus 100 millivolts, and $V_3$ equals the target voltage plus 100 millivolts, so that the voltage difference $V_3$ –$V_2$ is about 200 millivolts. It should be mentioned that a 100 millivolt offset is preferable because in the Schlueniger 207S stripper, approximately 50 mils of cutting is represented by 100 millivolts of blade control voltage. Such offset also ensures that the stripper's blades will cut through the insulation of any wire that is smaller than the norm whose diameter is used to define the target voltage. This means that the stripper's blades 5, 7 would normally nick the wire's center conductor 18 except that the proximity detection circuit defined below prevents nicking.

Such difference is not sufficient to continue the discharge of capacitor $C_2$ in FIG. 7 through diode $D_1$. Thus, any further discharge of $C_2$ can only pass through the resistor leg 38 which contains $R_5$ and $R_6$, the latter producing the slow linear decline indicated by arrow 44 in FIG. 14. Such decline passes through the target voltage at 46 in the same FIG. Preferably, the slow decline occurs over a period of approximately one to two seconds ($t_3$), and includes dashed portion 48 in time periods $t_4$ and $t_5$.

When a cutting cycle is ended as a result of detection of blade proximity to the wire's center conductor, as will be further described below, and after the slug is removed, the input voltage $V_1$ is once again restored to the blade "open" value. This is indicated at 50 in FIG. 14. The blade control voltage $V_3$ must quickly follow $V_1$ in order to open the blades and release the stripped wire. Referring again to FIG. 7, this happens because capacitor $C_2$ quickly recharges through diode $D_2$ and the low resistance of $R_7$.

As is shown in FIG. 1, the voltage $V_3$ produced by the segmented arrangement described above is applied at 150 through control switches that are indicated at $A_6$. Such circuitry is more specifically shown in FIGS. 10a and 10b and will be explained later after sections $A_2$-$A_5$ of FIG. 1 are first explained.

In FIG. 1, the section identified at $A_2$ indicates blade rotation delay control circuitry which allows selective additional rotation of the blades 5, 7 after detection of insulation cut-through. Its output to section $A_6$ is indicated at 120 in FIGS. 1 and 10a. Sections $A_3$ -$A_5$ together make up a cut-though detection system that will now be described by first referring to FIG. 8.

Briefly, the key to the cut-through detection system is to electrically isolate the stripper's blade-drive assembly 9 (see FIG. 4) so that a high voltage may be placed on the stripper's blades 5, 7. As the stripper's blades 5-7 out through the insulation 16 of the wire to be stripped (see FIGS. 6 and 8), the center conductor 18, which is electrically neutral, is exposed to the high voltage on the blades 5-7 as soon as the blades break through the wire's insulation 16. The final 1 mil or so of insulation splits ahead of the blades 5, 7 which are wedge-shaped. Such close proximity creates an uninsulated gap between the blades 5, 7 and conductor 18, which creates a short-duration arc (less than a microsecond), and a high current flows between the blades 5, 7 and the center conductor 18, until the conductor 18 reaches approximately the same voltage as the blades. Detection of such a pulse can be used as a signal to stop further inward movement of the blades, and the means for accomplishing such will now be described. Most importantly, such detection enables the inward travel of blades 5, 7 to be stopped before they contact and nick the conductor 18.

As is shown in FIG. 8, the high voltage applied to the blade-drive assembly 9 (which is indicated generally at 58 in FIGS. 1 and 8) may be supplied by a conventional DC voltage supply that is generally indicated at 52. Such supply operates from a conventional 110 volt AC power source and converts alternating current to direct current via a step-up transformer 54, a diode $D_1$, which rectifies polarity, and a charging network made up of a capacitor $C_1$ and resistors $R_2$, $R_5$. This form of high voltage DC source is readily available from numerous sources and would be well-familiar to a person skilled in the art.

Preferably, the DC source creates approximately 300 volts of direct current which may be applied to the blade-drive assembly 9 by means of a commutator 56. However, such high voltage must be made human-safe in the event that an operator contacts the blade-drive assembly 9. For this reason, resistors $R_3$ through $R_6$ and capacitors $C_2$ are provided for limiting the possible electrical current and total energy to which a stripper operator could be exposed. Other safety devices of standard practice associated with high voltage (safety covers, interlocks) must be used (not shown).

Another element of the high voltage DC source supplied to the blade-drive assembly 9 is a silicon controlled rectifier $Q_1$. This device holds the voltage output 58 supplied to commutator 56 to approximately zero volts when $Q_1$ is turned on by a signal indicated at 60.

Such signal is a reset high voltage signal supplied from the control logic and control switches shown in FIGS. 10a and 10b, which will be further described later.

As the stripper's blades 5, 7 out into the wire's insulation 16, as shown in FIG. 8, the rate of blade closure is very slow, in accordance with the shape defined at 44 in FIG. 14 as previously described. Such slow rate of closure permits the blades 5, 7 to wedge-split open the insulation next to the wire's center conductor 18 before the blades actually contact the center conductor. When this happens, the abovedescribed short-duration current pulse moves from the blades 5, 7 to the center conductor.

Such pulse is detected by a conventional voltage-isolated current-pulse detector indicated at 62 in FIG. 8. The detector 62 outputs a pulse at 64 to a pulse detector circuit, indicated generally at 66 in FIG. 9. The current-pulse detector 62 and pulse detector circuit 66 together make up that part of the invention's blade proximity system that is indicated at $A_4$ in FIG. 1.

Figure 9:
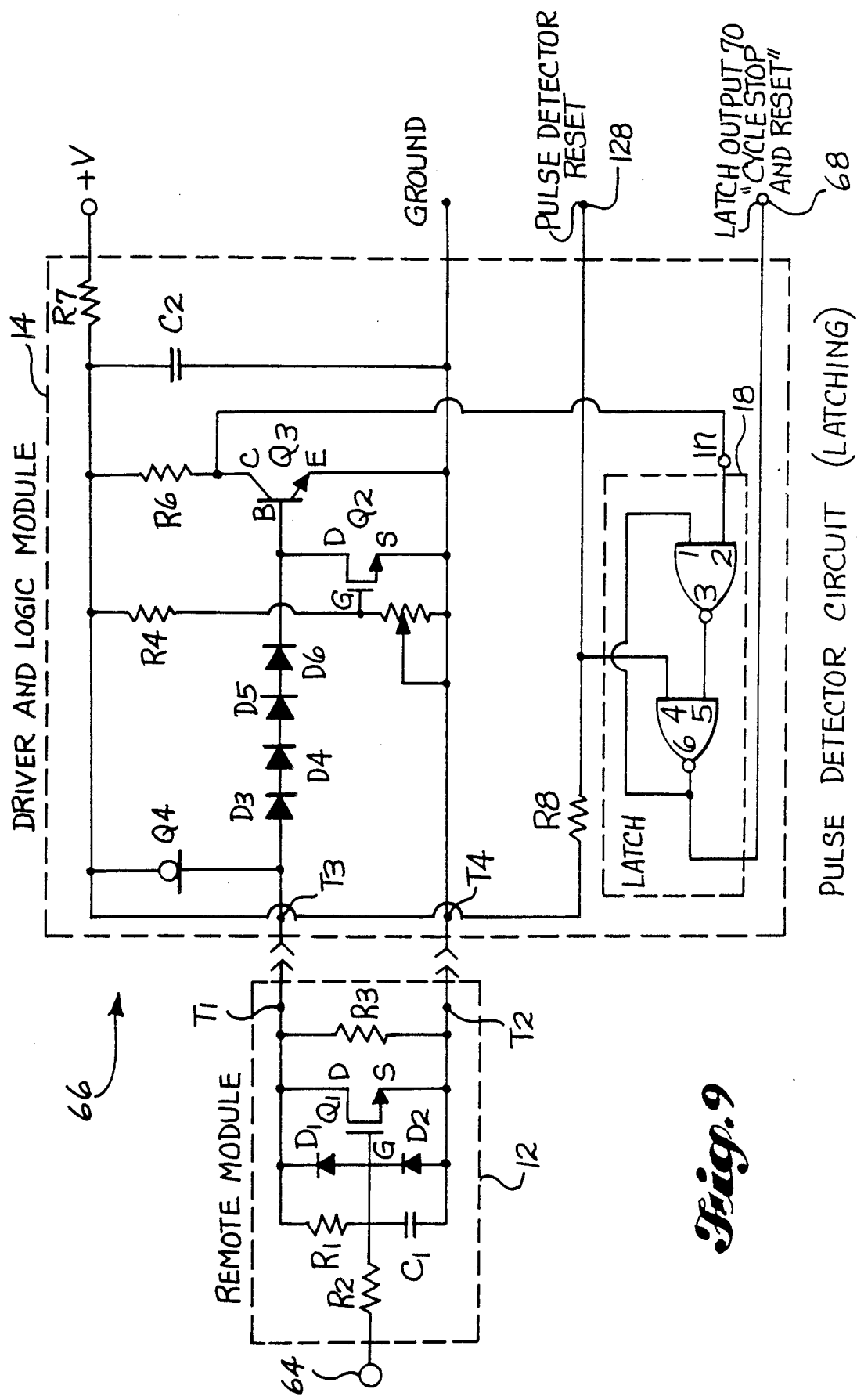
FIG. 9 is an electrical schematic of a pulse detection circuit, which is used in conjunction with the circuitry indicated at $A_4$ in FIG. 8.

The signal 64 triggers the pulse detector circuit 66 in FIG. 9, which generates a latched indicator output 68 that signals that further inward movement of the blades 5, 7 should be stopped. The way pulse detector circuit 66 accomplishes this is disclosed in U.S. Patent No. 4,715,100, and such description will not be repeated here. It is to be understood, however, that the disclosure of such patent is incorporated herein by reference.

Figure 10A:
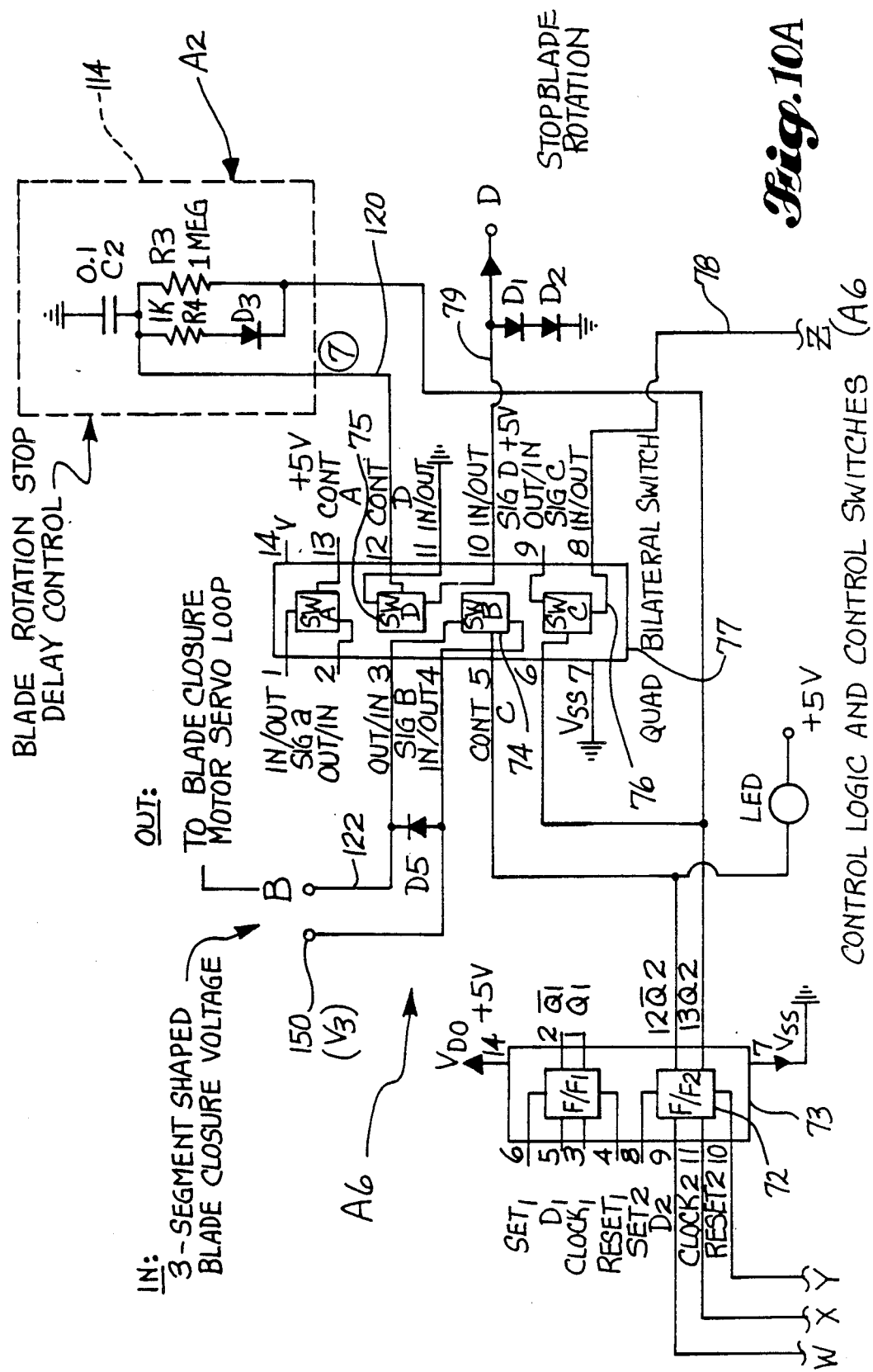
FIG. 10a is an electrical schematic, and is the first of a series of two views, and shows the control logic and control switches in accordance with the invention for obtaining the blade closure wave forms and timing relationships illustrated in FIG. 11, and corresponds to sections $A_2$ and $A_6$ of FIG. 1.
Figure 10B:
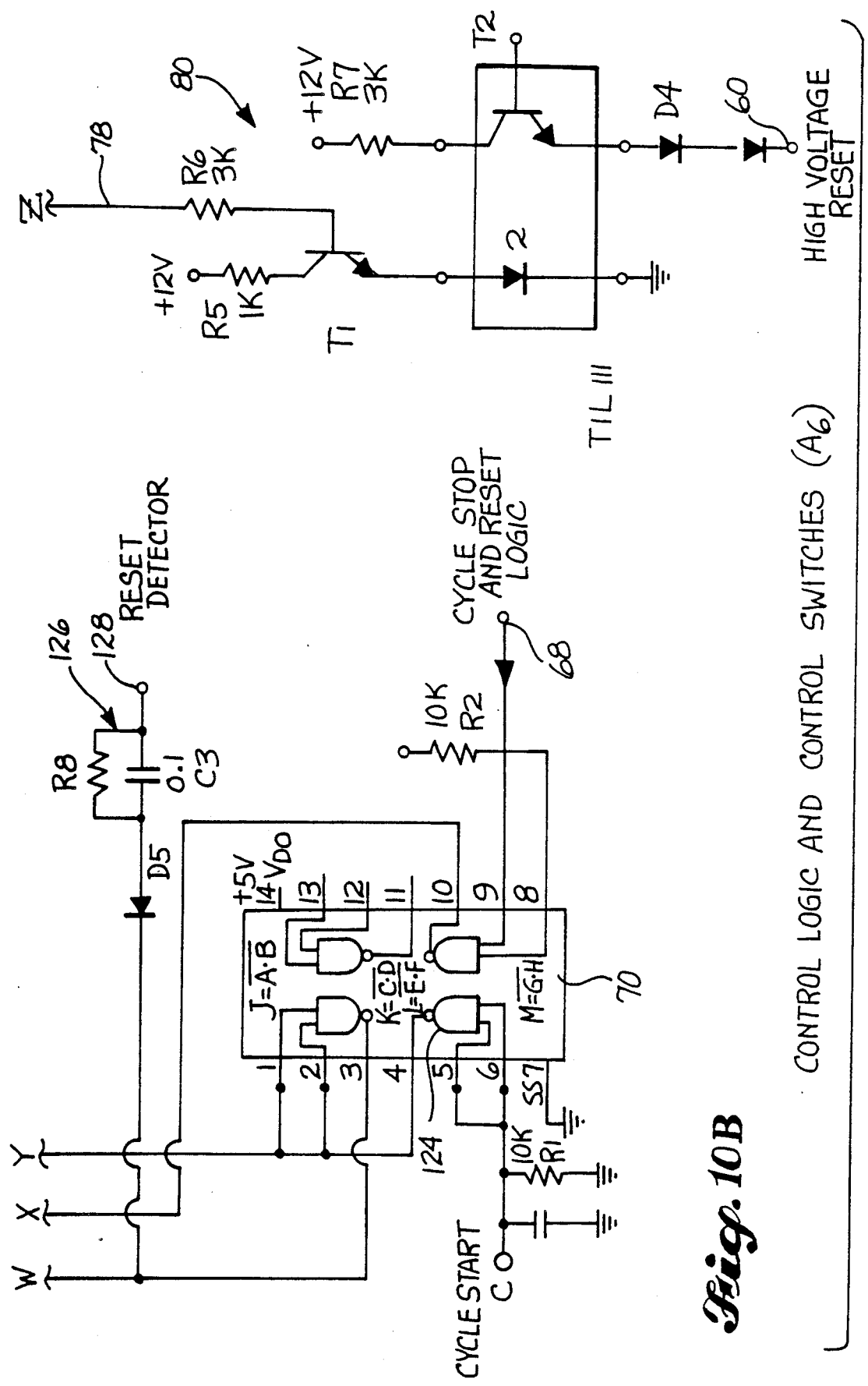

The latch output signal 68 from circuit 66 in FIG. 9 is received by the control logic and control switches shown in FIGS. 10a and 10b. Referring particularly to FIG. 10b, the signal 68 is applied to a logic gate 70 which toggles the flip-flop (FF) clock 72 of an integrated circuit 73 shown in FIG. 10a. This causes the clock's output $Q_2$ to go low which, in turn, turns off switch B, indicated at 74. The latter is one of three switches 74, 75, 76 in another integrated circuit 77. This stops any further change in the voltage input to the blades' servodrive, thus stopping further blade closure and holding the blades in position until the cutting cycle is completed (after the wire's insulation or slug is pulled off the wire). Such output of switch B is indicated at "B" in FIG. 10a, which also corresponds to the same points in FIGS. 1 and 3.

The short-duration pulse from the blades 5, 7 to the wire's center conductor 18 causes the center conductor to change from a voltage-neutral condition to one that is close to the voltage of the blade-drive assembly 9 (approximately 300 volts). It is important that the conductor be returned to the voltage-neutral condition before it is removed from the wire stripper, because the wire may subsequently come into contact with other systems whose performance could be altered or damaged if the wire retained its charge, or more importantly, the wire must be neutral if its other end is to be similarly stripped.

In order to return the wire to a voltage-neutral condition, and referring now to FIGS. 10a, 10b and FIG. 8, the previously described latch output of pulse detector circuit 66 in FIG. 9 causes FF output $Q_2$ in FIG. 10b to go high, which turns on switch C (indicated at 76 in FIG. 10a). Such switch 76, in turn, outputs a signal at 78 that is input to a high voltage reset circuit, the latter being indicated at 80 in FIG. 10b. Such circuit 80 outputs signal 60 to $Q_1$ in FIG. 8, which brings the voltage at 58 back to near zero, and correspondingly brings the voltage of blade-drive assembly 9 to zero. When this happens, a reverse short-term current pulse travels back from the wire's center conductor 18 to the blade-drive assembly until the wire once again achieves a voltage-neutral condition or a near voltage-neutral condition.

In order to accomplish the above-described pulse-detection and subsequent voltage-neutralization of the center conductor, it is necessary that the previously-described blade-drive assembly 9 shown in FIG. 4 be electrically isolated from other stripper components. This is not done in the stripper disclosed in the '828 patent, nor is it done in the commercial version of the same. Referring to FIG. 1 of the '828 patent, for example, it is seen that the shaft identified by reference numeral 2 there is mounted to a metal casing 1. Although the '828 patent does not disclose any particular bearing structure for mounting the shaft 2 to the case 1, in actuality, metal bearings are used. What this means is that the case 1 or housing of the stripper is in electrical contact with the shaft.

Figure 15:
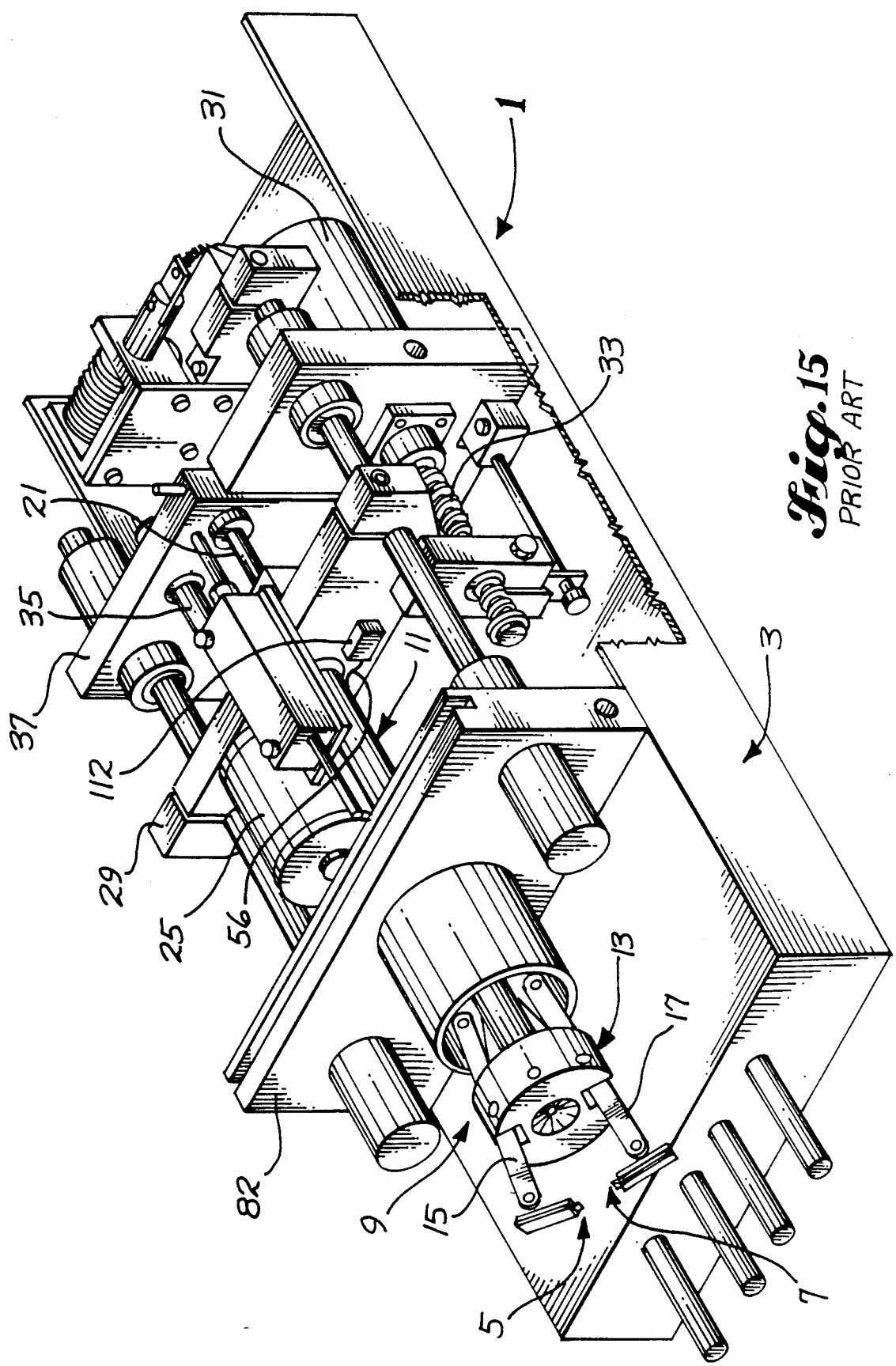
FIG. 15 is a pictorial view of the '828 stripper shown in FIG. 2, but with a portion of the stripper's housing removed, and is labeled "Prior Art"
Figure 16:
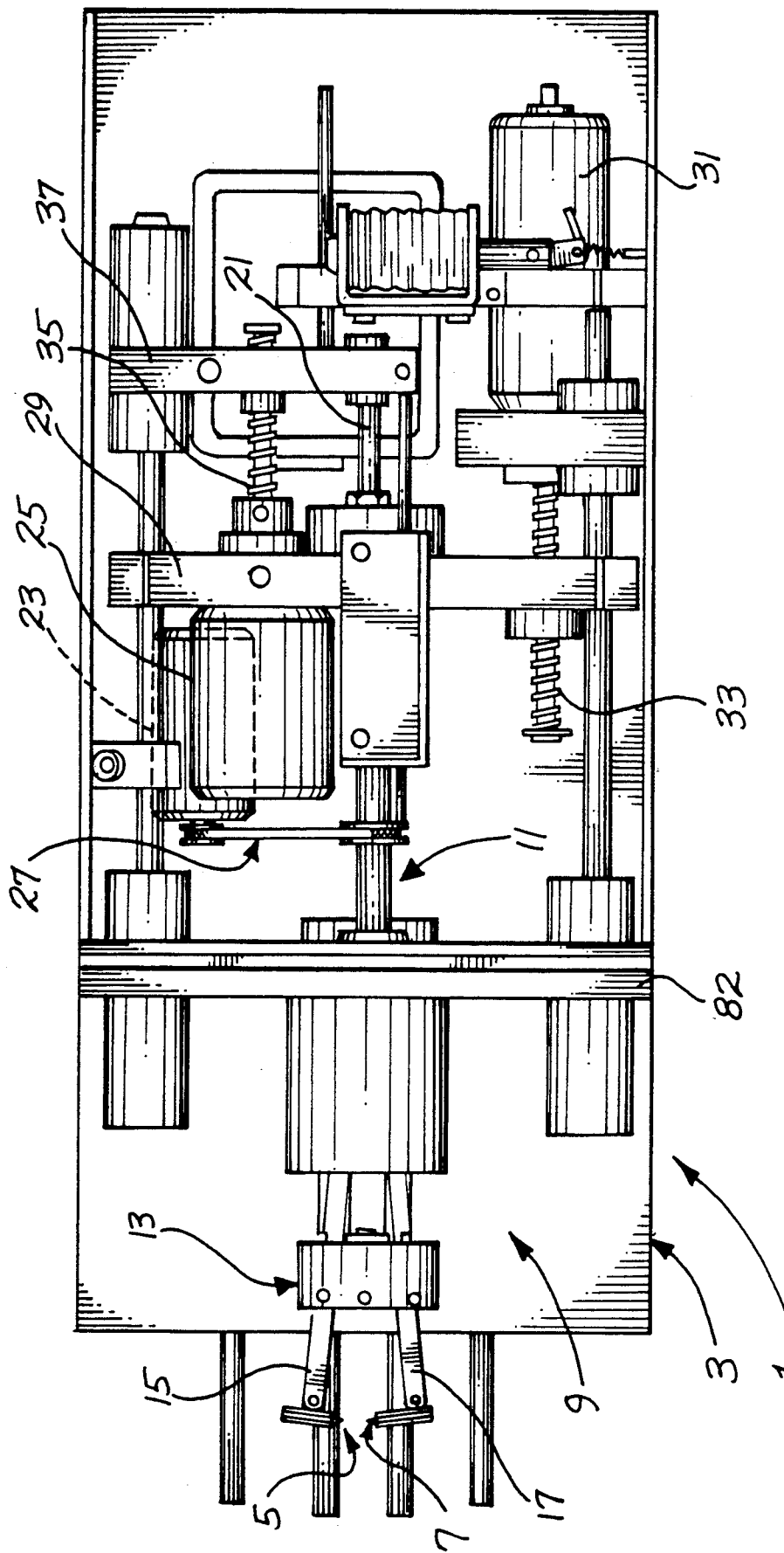
FIG. 16 is a top-plan view of the stripper shown in FIG. 15, and is labeled "Prior Art"
Figure 17:
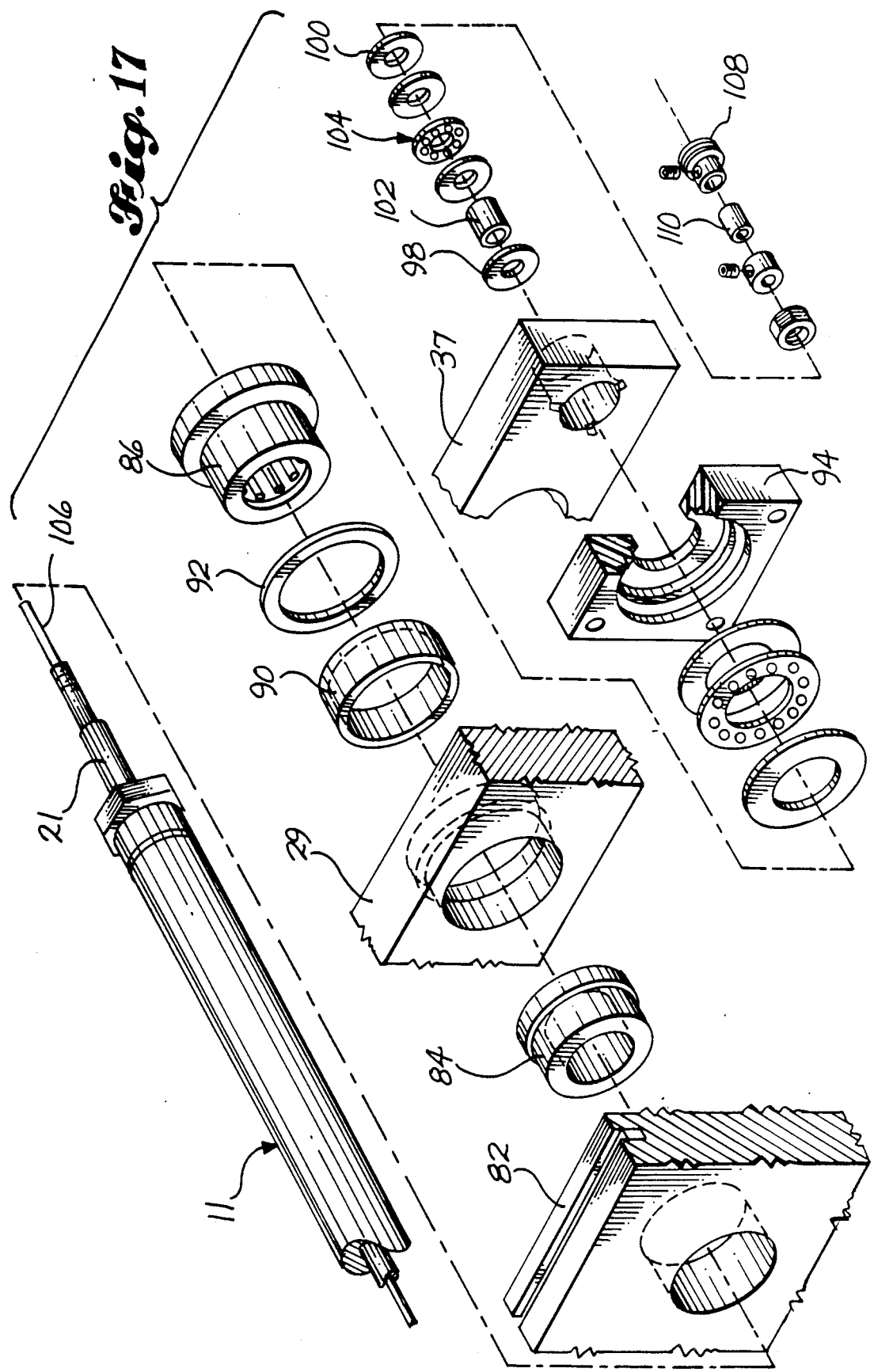
FIG. 17 is an exploded pictorial view illustrating how the '828 stripper's blade-drive assembly as shown in FIG. 4 is electrically isolated from other components of the stripper in accordance with the invention.
Figure 18:
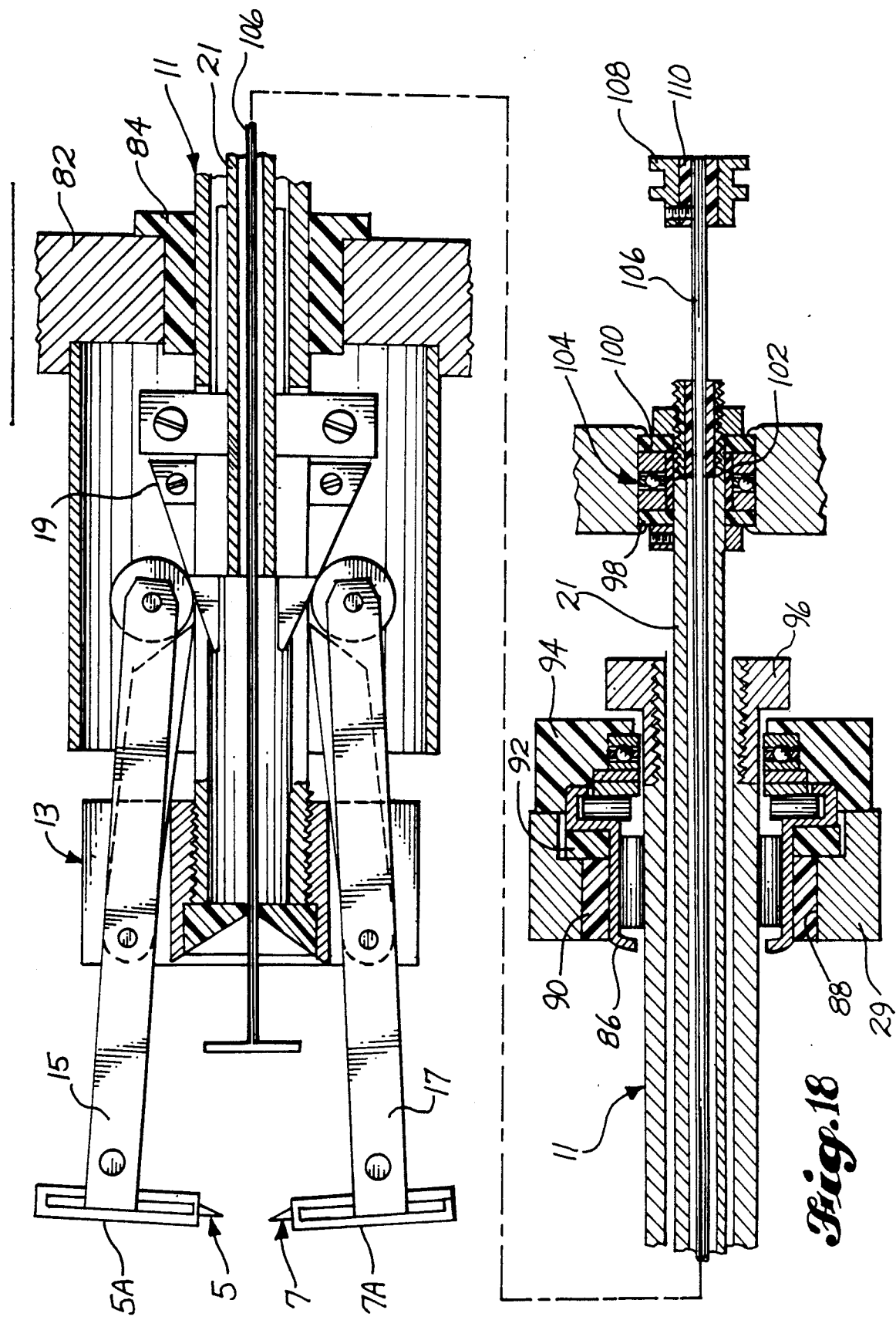
FIG. 18 is a side cross-sectional view of the components shown in FIG. 17.

In the present invention, dielectric materials are used to either modify or replace existing bearings, in order to accomplish electrical isolation. Referring first to FIGS. 15 and 16, it can be seen that the blade-drive assembly 9 is connected either directly to the stripper's housing, or to other components carried by such housing, both at casing wall 82 and the previously-described movable brackets 29 and 37. Referring to FIG. 18, the shaft of the blade-drive assembly 9 is preferably isolated from casing bracket 82 by a dielectric sleeve bearing 84. A metal roller bearing 86 normally is used to mount the shaft to bracket 29 which is aft of casing bracket 82 (see FIG. 16). In the present invention, the bore through bracket 29, which is indicated at BB, is enlarged and the metal bearing 86 is surrounded by a dielectric sleeve 90 and annulus 92. These prevent metal-to-metal contact. The rearward side of the metal bearing 86 is covered by a dielectric cap 94, against which a metal nut 96 is threaded onto the shaft's aft end. As a skilled person would know, such nut 96 fixedly connects the blade-drive shaft 11 to bracket 29, so that the shaft 11 axially reciprocates along with movement of such bracket. Such operation need not be further described here as it would be familiar to anyone having prior knowledge of the Schlueniger Model 207S wire stripper.

The inner shaft of the blade-drive assembly 9 must also be isolated from bracket 37 in the manner shown in FIG. 18. This is accomplished by using dielectric washers 98, 100, and a dielectric sleeve 102. These separate the shaft from both bracket 37; and its associated bearing structure indicated generally at 104, which assists rotation of the shaft within bracket 37. Lastly, the end of a rod 106, which is mechanically moved axially inside hollow thrust tube 21 of blade-drive assembly 9 by the end of a wire to be stripped, is isolated from a collar 108 that is mechanically connected to a lever arm in the Schlueniger stripper (not shown in the drawings). The latter triggers a new cutting cycle. Such isolation is accomplished by another dielectric sleeve 110.

The commutator 56 previously described may be mounted at several suitable locations so that it is in contact with the drive shaft 11 of blade-drive assembly 9. FIG. 15 indicates one suitable location at 112, for example. However, it is to be appreciated that the commutator 56 is mounted so that it is also electrically isolated from the housing.

Referring again to FIGS. 10a and 10b, the NAND gates of integrated circuit 70 are used as input buffers. The NAND gate outputs W, X, Y drive the flip-flop 72 of integrated circuit 73 shown in FIG. 10a, which generates two output pulses of opposite polarity ($Q_2$ and e,ovs/$Q_{2'}$). These outputs are used to turn on and turn off the switches of integrated circuit 77. Only three of the four switches shown in circuit 77 are actually used. The function of each is as follows.

At the start of a cutting cycle, the FF output $\overline{Q}$ goes high, and turns on switch B shown at 74 in FIG. 10a. This applies the shaped blade closure voltage $V_3$ previously described to control servomotor 25 in the stripper. As previously described, when the blades 5, 7 break through the wire's insulation 16, the detector output at 68 in FIG. 10b is applied to logic gate 70, which toggles the FF clock in circuit 73. This causes $\overline{Q}_{2'}$ to go low and turns off switch B, indicated at 74 in FIG. 10a. This stops any further change in the input to the blade's servomotor 25, thus stopping further blade closure and holding the blades at the stopped closure position until the cutting cycle is completed. The cutting cycle is completed, of course, when the insulation slug is pulled off the stripped wire. At such time, the shaped voltage $V_3$ returns to positive.

Switch B, indicated at 74 in FIG. 10a, is paralleled by diode $D_5$ in FIG. 10a, the latter allowing current conduction when the shaped voltage $V_3$ goes positive. This causes the blades's servodrive to open the blades to the fully-open position. By way of reference, such signal is indicated at 122 in FIGS. 10a and 1.

The flip-flop output $Q_2$ in FIG. 10a goes low at the start each cutting cycle, and this further turns off both switches C and D, the latter being indicated at 76 and 75. One side of switch D, indicated at 79, is connected to connection point D in FIG. 3. This is further connected to the transistor 14' inside block 14 of FIG. 3, which operates to control blade rotation. When switch D is open, it has no effect on blade rotation. However, when it closes, as a result of the stripper's blades 5, 7 breaking through the insulation of the wire, a ground potential is applied by switch D that stops further blade rotation until completion of slug removal. A delay of stopping blade rotation after insulation breakthrough is governed by a blade rotation delay control circuit 114 shown in FIG. 10a. Such circuit 114 corresponds to section $A_2$ of FIG. 1.

Once again referring to FIG. 3, a "cycle start" signal is provided by existing stripper circuitry to connection point C which is also indicated in FIG 10b. Such signal triggers one of the NAND gates 124 in buffer 70 which resets the flip-flop 72 of integrated circuit 73 in FIG 10a, and also triggers a reset detector, indicated generally at 126 in FIG 10b. The reset detector 126 also resets the pulse detector circuit 66 shown in FIG. 9, as indicated at 128 in both FIGS. 10b and FIG. 9.

The preceding description sets forth the best mode for carrying out the invention as it is currently known by the inventor. As should be evident from both the disclosures set forth here and any patents which may issue from the '178 and '181 applications discussed previously, the invention has gone through several stages of development. It is likely, therefore, that further developments may arise that could make it easier to implement the invention in conjunction with the '828 stripper. Because it is difficult to foresee further developments and/or improvements in the invention as described here, it is to be understood that the preceding description is not to be taken in the limiting sense. Rather, the scope of the invention is defined by the subjoined patent claims which follow, the interpretation of which is to be made in accordance with the established doctrines of patent claim interpretation.

What is claimed is:

1. A method for improving a rotary wire stripper, said stripper being characterized in that, when in operation, said stripper has at least one blade that rotates around the end of a wire to be stripped, in a manner so that said blade's cutting edge circles about said wire, and said blade moves in a generally radially inward fashion toward said wire as said blade circles the same, until its cutting edge contacts and cuts into the wire's insulation to a certain depth, to enable stripping of the insulation from the wire's center conductor, and further, said stripper being made up of several components including a housing structure, and at least two drive motors mounted to said housing structure, and a blade-drive assembly that includes an electrically-conductive drive shaft rotatably mounted to said housing structure, and an electrically-conductive head assembly mounted to said shaft that carries said blade, said head assembly rotating said blade around said wire as said shaft rotates, and said shaft being driven in rotation by one of said motors during operation of said stripper, and said head assembly being adapted for moving said blade toward said wire during stripper operation independently of shaft rotation, such movement being driven by said other motor, and both said shaft and said head assembly being in electrical communication with said blade, the improvement comprising:

electrically isolating said blade-drive assembly from said other stripper components;

applying an electrical voltage to said blade-drive assembly, in a manner so that as said blade cuts inwardly through said wire's insulation during a stripping operation, an electrical discharge occurs from said blade-drive assembly to said wire's center conductor when said blade approaches near said center conductor;

sensing said discharge and stopping further inward movement of said blade in response thereto, wherein said wire is stripped after such movement is stopped.

2. The method of claim 1, wherein applying an electrical voltage to said blade-drive assembly includes applying a voltage of approximately 300 volts DC to said blade-drive assembly.

3. A method for controlling the closure rate of the blades of a rotary wire stripper relative to the center conductor of an insulated wire, for stripping the wire's insulation from its center conductor, said stripper being characterized in that it has a pair of diametrically opposed blades that are driven in rotation around said wire, in a manner such that the cutting edges of said blades circle around said wire and close inwardly as they circle said wire, from an open condition where said blades are spaced from said wire, to a closed condition where said blades' cutting edges have substantially cut through said wire's insulation, such closing movement being controlled by a voltage signal whose magnitude defines the position of blade closure with respect to said wire, the magnitude of such signal changing from a first value corresponding to said open condition of said blades, to a certain target value corresponding to said closed condition, wherein said target value is variably selected by the user of said stripper in accordance with the type of wire to be stripped, so that the distance between said blades' cutting edges in the closed condition substantially corresponds to the nominal diameter of the wire's center conductor, the method comprising:

defining a nonlinear rate of change in the magnitude of said voltage signal so that the rate of blade closure from said open condition to said closed condition is also nonlinear, including creating a high rate of change in the magnitude of said voltage signal between said open condition to a certain nominally closed position where a certain thickness of insulation remains between said blades' cutting edges and said wire's center conductor, followed by creating a slow rate of change in the magnitude of said voltage signal between said nominally closed position and said closed condition, in a manner so that said voltage signal slowly approaches said target voltage as said blades' cutting edges approach near said wire's center conductor.

4. A method for controlling the closure rate of the blades of a rotary wire stripper relative to the center conductor of an insulated wire, for stripping the wire's insulation from its center conductor, said stripper being characterized in that it has at least a pair of diametrically opposed blades that are driven in rotation around said wire, in a manner such that the cutting edges of said blades circle around said wire and close inwardly as they circle said wire, from an open condition where said blades are spaced from said wire, to a closed condition where said blades' cutting edges have substantially cut through said wire's insulation, said wire being stripped while said blades are in said closed condition, and said blades reopening to said open condition after said wire is stripped, to define a complete cutting cycle, the method comprising:

defining a non-linear rate of change in the rate said blades close from said open condition to said closed condition, including:

creating a high rate of change in blade closure from said open condition to a certain nominally closed position during an early portion of said cutting cycle, wherein a certain thickness of insulation remains between said blades' cutting edges and said wire's center conductor when said blades are in said nominally closed position, followed by creating a slow rate of change in blade closure from said nominally closed position to said closed position, in a manner so that said blades slowly cut through the insulation near said wire's center conductor.

5. A method for controlling the closure rate of the blades of a rotary wire stripper relative to the end of an insulated wire, for stripping the wire's insulation from its center conductor, said stripper being characterized in that it has a pair of diametrically opposed blades that are driven in rotation around said wire, in a manner such that the cutting edges of said blades circle around said wire and close inwardly as they circle, from an open condition, where said blades are spaced from said wire, to a closed condition, where said blades' cutting edges have cut through said wire's insulation, such closing movement being controlled by a voltage signal whose magnitude defines the position of blade closure with respect to said wire, the magnitude of such signal changing from a first value corresponding to said open condition of said blades, to a certain target value corresponding to said closed condition, wherein said target value is variably selected by the user of said stripper in accordance with the type of wire to be stripped, so that the distance between said blades' cutting edges in the closed condition substantially corresponds to the nominal diameter of the wire's center conductor, the method comprising:

defining a nonlinear rate of blade closure from said open condition to said closed condition, including:

creating a high rate of change in the magnitude of said voltage signal between said open condition and a certain nominally closed position where at least a certain thickness of insulation remains between said blades' cutting edges and said wire's center conductor, followed by creating a slow rate of change in the magnitude of said voltage signal between said nominally closed position and the position where said insulation is cut through, by defining a voltage value that is off-set from said target voltage, said off-set voltage corresponding to a blade closure that is less than the blade closure at said target voltage, and less than the nominal diameter of said wire's center conductor, and by causing the magnitude of said voltage signal to slowly approach said off-set voltage after said blade closure has reached said nominally closed position, to slowly bring said blades' cutting edges adjacent said wire's center conductor; and sensing a certain proximity of said blades+.cutting edges relative to said center conductor corresponding to said edges breaking through said wire's insulation near said center conductor; followed by terminating the rate of change in magnitude of said voltage signal when said certain proximity is sensed, to impede said blades' edges from coming into contact with said center conductor.

6. The method of claim 5, wherein sensing said certain proximity of said blades' cutting edges relative to said center conductor includes placing a relatively high voltage on said blades, in a manner so that when said blades outs through said insulation a relatively short-duration current pulse travels from said blades to said center conductor; and sensing said short-duration current pulse.

7. The method of claim 6, further including removing said high voltage from said blades after said current pulse is detected, to reduce the voltage on said blades to a level that is below the voltage on said center conductor sufficiently so that a short-duration current pulse travels back from said center conductor to said blades' to reduce the voltage of said center conductor.

8. For use in connection with a wire stripper, said stripper being characterized in that it has at least one blade that moves laterally toward a wire to be stripped, until said blade's cutting edge contacts and outs through the wire's insulation, to enable stripping of the insulation from the wire's center conductor, a method of detecting blade proximitY relative to said wire's center conductor, comprising:

placing a relatively high voltage on said blade, in a manner so that when said blade cuts through said insulation a relatively short-duration current pulse travels from said wire's blade to said center conductor; and sensing said short-duration current pulse; and stopping further inward travel of said blade toward said wire in response to sensing of said current pulse.

9. The method of claim 8, including reducing the voltage of said blade after said current pulse is detected to a level that is sufficiently below the voltage on said center conductor so that a short-duration current pulse travels back from said center conductor to said blade, to reduce the voltage of said center conductor.

10. An improved rotary wire stripper for stripping the insulation from a wire's end, comprising:

a housing;

a blade-drive assembly mounted to said housing in a manner such that said blade-drive assembly is electrically isolated from said housing;

a commutator mounted to said housing and being in electrical contact with said blade-drive assembly, said commutator also being electrically isolated from said housing;

an electrical power source;

sensing means for detecting a current transmission between said blade-drive assembly and said wire during a stripping operation;

means for interconnecting said commutator and said power source, to place a voltage on said blade-drive assembly during the beginning of a wire-stripping operation, and for reducing the voltage on said blade-drive assembly after said sensing means detects a current transmission from said blade-drive assembly to said wire.

* * * * *

UNITED STATES PATENT AND TRADEMARK OFFICE
CERTIFICATE OF CORRECTION

PATENT NO. : 4,999,910

DATED : March 19, 1991

INVENTOR(S) : Dan A. Cross

It is certified that error appears in the above-identified patent and that said Letters Patent is hereby corrected as shown below:

Col. 1, line 47, there is a period after "here".

Col. 2, line 65, "Fig. 15" begins a new paragraph.

Col. 3, line 29, "blades'" should be -- blades, --.

Col. 3, line 30, there is a period after "duration".

Col. 3, line 39, "(Vout)" should be -- (Vcut) --.

Col. 3, line 47, "Vout" should be -- Vcut --.

Col. 5, line 45, "she" should be -- the --.

Col. 5, line 53, there is a period after "blades"; and "out" should be -- cut --.

UNITED STATES PATENT AND TRADEMARK OFFICE
CERTIFICATE OF CORRECTION

PATENT NO. : 4,999,910

DATED : March 19, 1991

INVENTOR(S) : Dan A. Cross

It is certified that error appears in the above-identified patent and that said Letters Patent is hereby corrected as shown below:

Col. 7, line 36, "Fig. 10a" starts a new paragraph.

Col. 7, line 57, "Fig. 15" starts a new paragraph.

Col. 8, line 14, there is a period after "stripper".

Col. 8, line 47, "out" should be -- cut --.

Col. 9, line 10, "out-cycles" should be -- cut-cycles, --.

Col. 9, line 33, "out" should be -- cut --.

Col. 9, line 61, "0.2" should be -- -0.2 --.

Col. 10, line 1, "Where" should be -- where --.

Col. 11, line 23, "out" should be -- cut --.

Col. 11, line 65, "assemblY" should be -- assembly --.

Col. 12, line 4, "out" should be -- cut --.

Col. 12, line 11, "abovedescribed" is hyphenated.

Col. 12, line 32, delete the space after "10b".

Col. 12, line 43, delete the period before "which".

Col. 13, line 32, "BB" should be -- 88 --.

Col. 13, line 48, "37;" should be -- 37, --.

UNITED STATES PATENT AND TRADEMARK OFFICE
CERTIFICATE OF CORRECTION

PATENT NO. : 4,999,910

DATED : March 19, 1991

INVENTOR(S) : Dan A. Cross

It is certified that error appears in the above-identified patent and that said Letters Patent is hereby corrected as shown below:

Col. 13, line 68, delete the space after "10a".

Col. 14, line 2, "e,ovs/Q2/)" should be -- $\overline{Q_2}$) --.

Col. 14, line 13, " $\overline{Q_2}$/ " should be -- $\overline{Q_2}$ --.

Claim 5, col. 17, line 27, "blades+" should be -- blades' --.

Claim 6, col. 17, line 39, "out" should be -- cut --.

Claim 7, col. 18, line 1, "blades'" should be -- blades, --.

Claim 8, col. 18, line 6, "outs" should be -- cuts --.

Claim 8, col. 18, line 9, "proximitY" should be -- proximity --.

Signed and Sealed this

Seventeenth Day of November, 1992

Attest:

DOUGLAS B. COMER

*Attesting Officer*   *Acting Commissioner of Patents and Trademarks*